United States Patent
Jeong et al.

(10) Patent No.: US 12,461,633 B2
(45) Date of Patent: Nov. 4, 2025

(54) DISPLAY DEVICE

(71) Applicant: Samsung Display Co., LTD., Yongin-si (KR)

(72) Inventors: Hwan-Hee Jeong, Cheonan-si (KR); Sunhwa Kim, Cheonan-si (KR); Jongseon Park, Wonju-si (KR); Won-il Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/651,508

(22) Filed: Apr. 30, 2024

(65) Prior Publication Data

US 2024/0288977 A1 Aug. 29, 2024

Related U.S. Application Data

(63) Continuation of application No. 17/078,080, filed on Oct. 22, 2020, now abandoned.

(30) Foreign Application Priority Data

Nov. 22, 2019 (KR) .................. 10-2019-0151206

(51) Int. Cl.
*G06F 3/044* (2006.01)
*H10K 59/40* (2023.01)

(52) U.S. Cl.
CPC .......... *G06F 3/0446* (2019.05); *G06F 3/0445* (2019.05); *H10K 59/40* (2023.02); *G06F 2203/04102* (2013.01); *G06F 2203/04103* (2013.01); *G06F 2203/04111* (2013.01)

(58) Field of Classification Search
CPC .......... G06F 3/0445–0446; G06F 2203/04103; G06F 2203/04102; G06F 2203/04111; H10K 59/40
See application file for complete search history.

(56) References Cited

U.S. PATENT DOCUMENTS

| | | | |
|---|---|---|---|
| 10,139,974 B2 | 11/2018 | Hong et al. |
| 10,261,645 B2 | 4/2019 | Shinoda |
| 10,310,691 B2 | 6/2019 | Pu et al. |
| 10,475,862 B2 | 11/2019 | Jeong et al. |
| 10,572,086 B2 | 2/2020 | Na et al. |

(Continued)

FOREIGN PATENT DOCUMENTS

| | | |
|---|---|---|
| CN | 107491201 A | 12/2017 |
| CN | 107665058 A | 2/2018 |

(Continued)

*Primary Examiner* — Hang Lin
(74) *Attorney, Agent, or Firm* — Womble Bond Dickinson (US) LLP

(57) ABSTRACT

An input sensor including a first electrode and a second electrode, which cross each other. The first electrode includes a first main portion extending in a first direction and first sensing portions and second sensing portions, which are disposed with the first main portion therebetween in a second direction and each of which extends from the first main portion. Each of the first sensing portions and the second sensing portions includes first sub-portions extending in the first direction and first middle portions disposed between the first sub-portions and between one of the first sub-portions and the first main portion.

12 Claims, 23 Drawing Sheets

(56) References Cited

U.S. PATENT DOCUMENTS

| | | | |
|---|---|---|---|
| 10,656,742 B2 | 5/2020 | Kim et al. | |
| 10,712,889 B2 | 7/2020 | Park et al. | |
| 2013/0093696 A1 | 4/2013 | Huang et al. | |
| 2016/0103516 A1* | 4/2016 | An | G06F 3/0443 |
| | | | 345/174 |
| 2016/0124543 A1 | 5/2016 | Chu et al. | |
| 2017/0212629 A1 | 7/2017 | Cho et al. | |
| 2017/0344162 A1* | 11/2017 | Lee | G06F 3/0443 |
| 2018/0299999 A1 | 10/2018 | Jeong et al. | |
| 2018/0329530 A1* | 11/2018 | Yu | G06F 3/0446 |
| 2018/0329552 A1* | 11/2018 | Song | G06F 3/04164 |

FOREIGN PATENT DOCUMENTS

| | | |
|---|---|---|
| CN | 107977120 A | 5/2018 |
| CN | 108388366 A | 8/2018 |
| CN | 109388280 A | 2/2019 |
| CN | 109426306 A | 3/2019 |
| KR | 10-2017-0089467 A | 8/2017 |
| KR | 10-2018-0059744 A | 6/2018 |
| KR | 10-2018-0116504 A | 10/2018 |
| KR | 1020190025096 A | 3/2019 |

\* cited by examiner

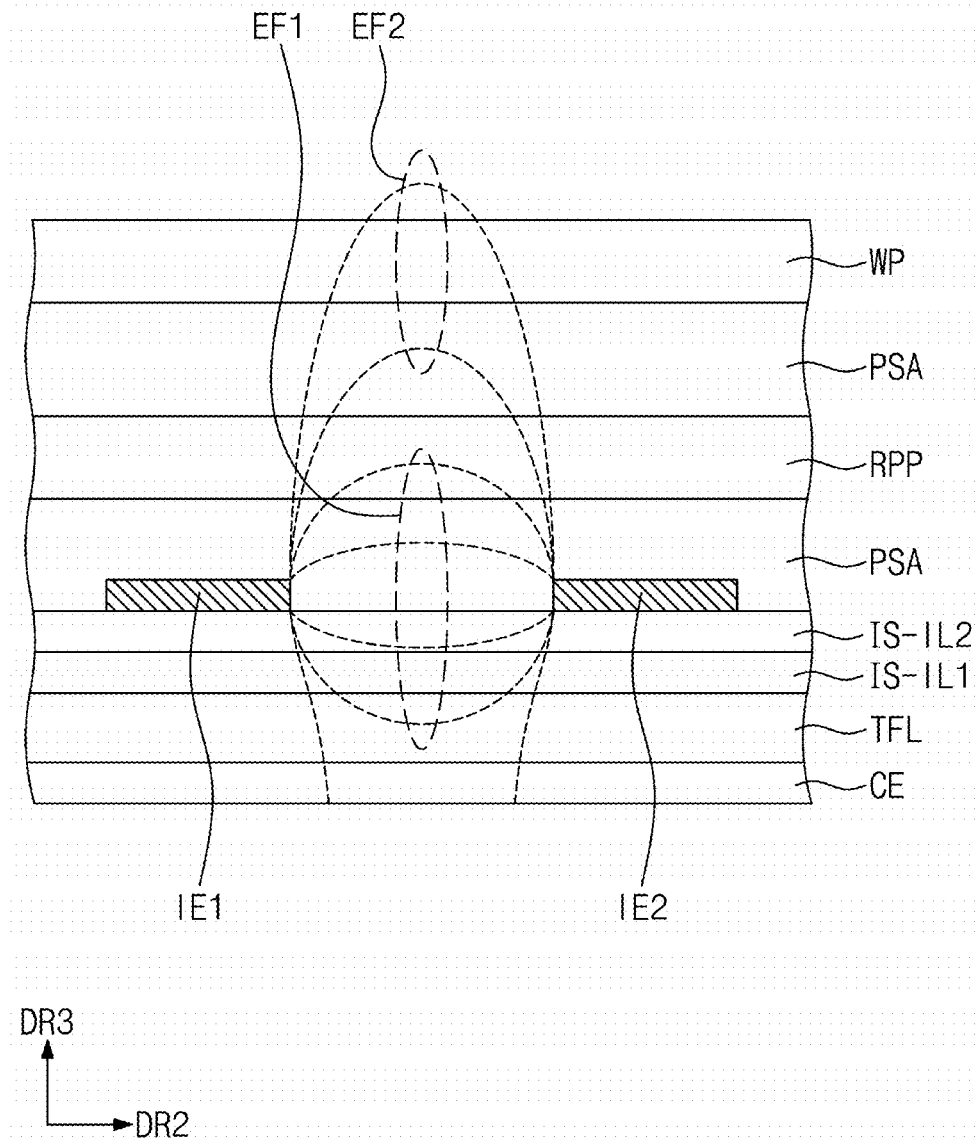

DISPLAY DEVICE

CROSS-REFERENCE TO RELATED APPLICATIONS

This application is a continuation of U.S. patent application Ser. No. 17/078,080, filed on Oct. 22, 2020, which claims priority to and the benefit of Korean Patent Application No. 10-2019-0151206, filed on Nov. 22, 2019, in the Korean Intellectual Property Office, the entire contents of each of which is hereby incorporated by reference for all purposes as if fully set forth herein.

BACKGROUND

Field

Exemplary embodiments of the invention relate generally to a display device, and more specifically, to a display device including an input sensor.

Discussion of the Background

Various electronic devices, such as smartphones, tablet PCs, notebook computers, navigation units, and smart televisions have recently been developed. These electronic devices include a display device to provide information. These electronic devices further include electronic modules in addition to the display device.

The display devices are input devices, such as a keyboard, a keypad, or a mouse. Also, the display devices recently include a touch panel as an information input device.

The above information disclosed in this Background section is only for understanding of the background of the inventive concept, and, therefore, it may contain information that does not constitute prior art.

SUMMARY

Exemplary embodiments of the invention provide a display device including an input sensor capable of preventing a malfunction.

Additional features of the inventive concept will be set forth in the description which follows, and in part will be apparent from the description, or may be learned by practice of the inventive concept.

An exemplary embodiment of the inventive concept provides a display device including: a display panel; and an input sensor disposed on the display panel and including a first electrode extending in a first direction and a second electrode extending in a second direction crossing the first direction. The first electrode includes: a first main portion extending in the first direction; and first sensing portions and second sensing portions, which are disposed with the first main portion therebetween in the second direction and each of which extends from the first main portion. Each of the first sensing portions and the second sensing portions includes: first sub-portions extending in the first direction; and first middle portions disposed between the first sub-portions and between one of the first sub-portions and the first main portion.

The second electrode may include: a third sensing portion disposed at one side of the first main portion in the second direction; a fourth sensing portion disposed at the other side of the first main portion in the second direction; and a bridge disposed on a different layer from the third sensing portion and the fourth sensing portion and connecting the third sensing portion and the fourth sensing portion and overlap the first main portion.

The third sensing portion may include: a second main portion disposed between the first sensing portions in the first direction; second sub-portions disposed outside the first sensing portions in the first direction; and second middle portions disposed between the second main portion and the second sub-portions.

At least the first sub-portions may be surrounded by the third sensing portion.

The input sensor may further include a dummy electrode disposed between the third sensing portion and at least one first sensing portion of the first sensing portions.

The dummy electrode may surround the one first sensing portion of the first sensing portions.

The display panel may include a light emitting element and an upper insulation layer covering the light emitting element, and the input sensor may further include a sensor insulation layer contacting the bridge. One of the bridge and the sensor insulation layer may contact the upper insulation layer.

A plurality of the second electrodes may be provided and arranged in the second direction. Two first sensing portions and two second sensing portions may be disposed between a first area, in which one second electrode of the plurality of second electrodes and the first electrode cross each other, and a second area, in which another second electrode, which is a most adjacent to the one second electrode of the plurality of second electrodes, and the first electrode cross each other.

The display panel may include a plurality of light emitting areas, and the first electrode and the second electrode may include a plurality of conductive lines configured to define a plurality of openings corresponding to the plurality of light emitting areas.

The display device may be foldable with respect to a reference axis.

The display device may further include: an upper member disposed on the input sensor and including a polarizer; and an adhesive member attaching the upper member and the input sensor.

The first electrode and the second electrode may contact the adhesive member.

Another exemplary embodiment of the inventive concept provides a display device including a display panel and an input sensor. The input sensor is disposed on the display panel and includes a sensing area, on which a sensing electrode is disposed, and a line area, on which a signal line is disposed. Here, a partial area of the sensing area is classified into a plurality of sensing areas having the same area.

The sensing electrode includes: a first main portion extending in a first direction; first sensing portions and second sensing portions, which are disposed with the first main portion therebetween in a second direction crossing the first direction and each of which extends from the first main portion, a third sensing portion and a fourth sensing portion, which are disposed with the first main portion therebetween in the second direction and among which one surrounds the first sensing portions, and the other surrounds the second sensing portions; and a bridge disposed on a different layer from the third sensing portion and the fourth sensing portion and connecting the third sensing portion and the fourth sensing portion.

The third sensing portion may include: a second main portion disposed between the first sensing portions in the first direction; and a second sub-portion extending from the second main portion and disposed between the first sensing portions in the second direction.

The input sensor may further include a dummy electrode disposed between the third sensing portion and at least one first sensing portion of the first sensing portions.

The dummy electrode may be an electrically isolating floating electrode.

A sum of areas of the third sensing portion and the fourth sensing portion may be greater than that of areas of the first sensing portions and the second sensing portions.

Another exemplary embodiment of the inventive concept provides a display device including: a display panel and an input sensor. The input sensor is disposed on the display panel and includes a first electrode extending in a first direction and a second electrode and a third electrode, which cross the first electrode.

The first electrode includes: first to third main portions arranged in the first direction; bridges disposed on a different layer from the first to third main portions and connecting adjacent main portions of the first to third main portions; and first sensing portions and second sensing portions, which are disposed with the corresponding main portion of the first to third main portions therebetween in the second direction and each of which extends from the corresponding main portion. One first sensing portion connected to the second main portion among the first sensing portions and one second sensing portion connected to the second main portion among the second sensing portions are surrounded by the second electrode, and another first sensing portion connected to the second main portion among the first sensing portions and another second sensing portion connected to the second main portion among the second sensing portions are surrounded by the third electrode.

Each of the first sensing portions and the second sensing portions may include: first sub-portions extending in the first direction; and middle portions disposed between the first sub-portions and between one of the first sub-portions and the corresponding main portion.

One first sensing portion connected to the first main portion among the first sensing portions and one second sensing portion connected to the first main portion among the second sensing portions may be surrounded by the second electrode, and one first sensing portion connected to the third main portion among the first sensing portions and one second sensing portion connected to the third main portion among the second sensing portions may be surrounded by the third electrode.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate exemplary embodiments of the invention, and together with the description serve to explain the inventive concept.

FIG. 8F is a view illustrating an electric field generated between a first electrode and a second electrode.

DETAILED DESCRIPTION

Figure 1A:
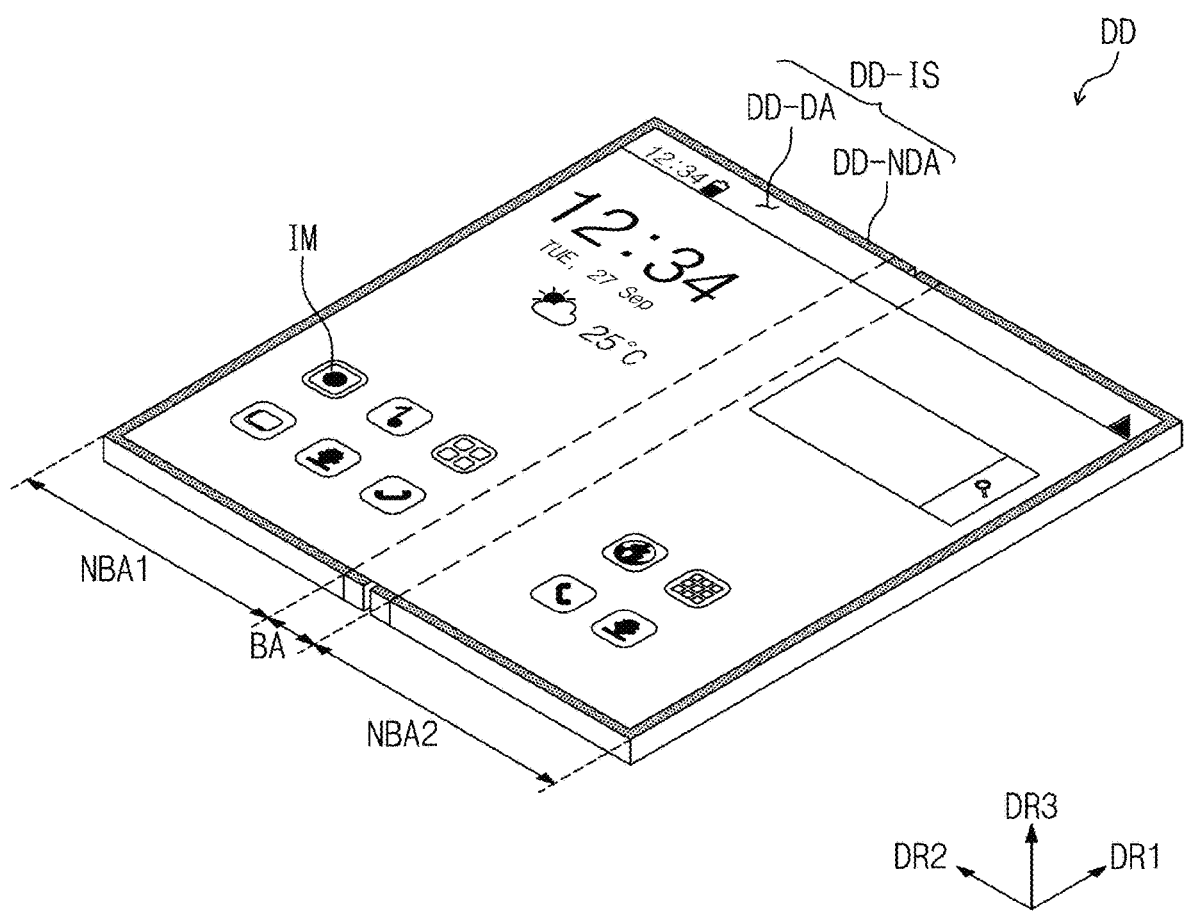
FIGS. 1A, 1B, and 1C are perspective views illustrating a display device according to an exemplary embodiment of the inventive concept.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the inventive concept will be described with reference to the accompanying drawings.

Figure 1B:
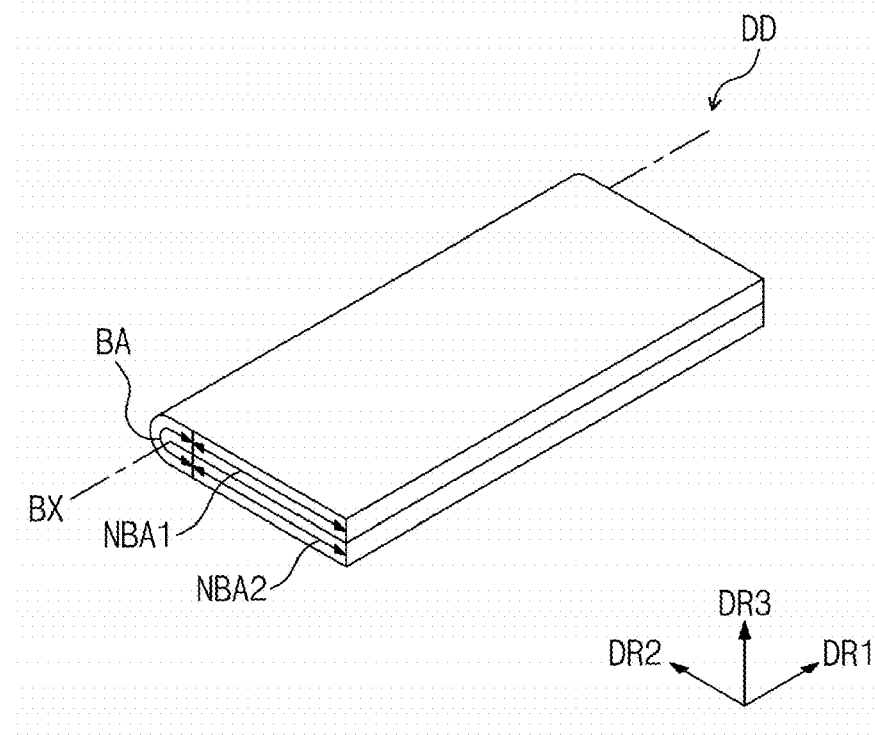
Figure 1C:
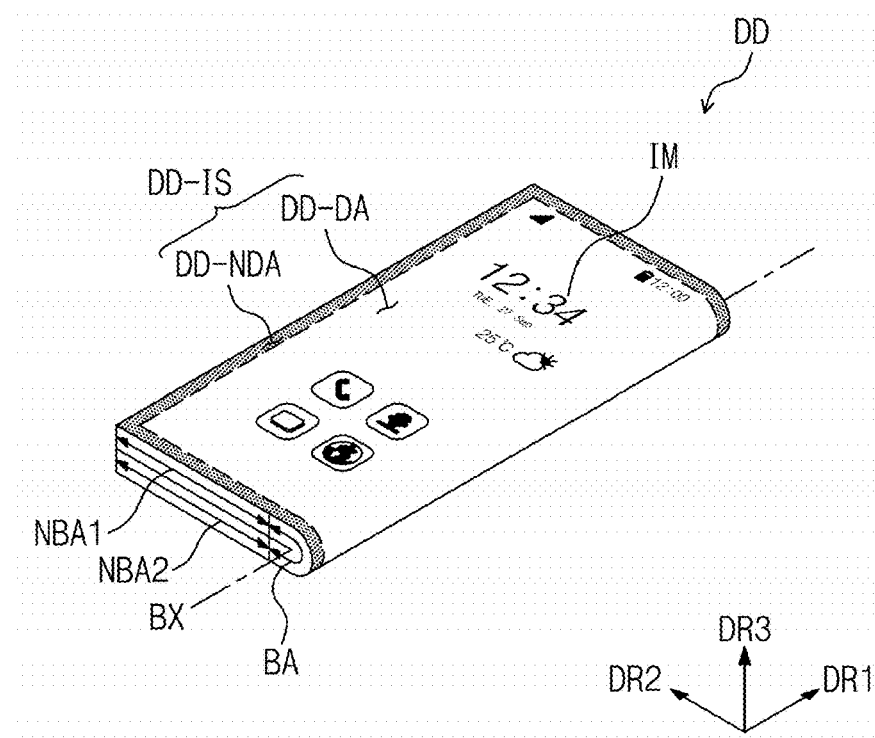

FIGS. 1A to 1C are perspective views illustrating a display device DD according to an exemplary embodiment of the inventive concept.

As illustrated in FIGS. 1A to 1C, a display surface DD-IS is parallel to a surface defined by a first directional axis DR1 and a second directional axis DR2. A normal direction of the display surface DD-IS, i.e., a thickness direction of the display device DD, indicates a third directional axis DR3. A front surface (or top surface) and a rear surface (or bottom surface) of each of members is distinguished by the third directional axis DR3. However, directions indicated by the first to third directional axes DR1, DR2, and DR3 may be relative concepts, and converted with respect to each other. Hereinafter, first to third directions may be directions indicated by the first to third directional axes DR1, DR2, and DR3, and designated by the same reference numerals, respectively.

As illustrated in FIGS. 1A to 1C, the display surface DD-IS includes a display area DD-DA on which an image IM is displayed and a non-display area DD-NDA adjacent to the display area DD-DA. The non-display area DD-NDA may be an area on which an image is not displayed. FIGS. 1A to 1C illustrate icon images as an example of the image IM. For example, the display area DD-DA may have a rectangular shape. The non-display area DD-NDA may surround the display area DD-DA. However, the inventive concept is not limited thereto. For example, the display area DD-DA and the non-display area DD-NDA may be relatively designed in shape.

As illustrated in FIGS. 1A to 1C, the display device DD may include a plurality of areas defined according to operation types. The display device DD may include a bending area BA that is bent on the basis of a bending axis BX, a first non-bending area NBA1 that is not bent, and a second non-bending area NBA2 that is not bent. As illustrated in FIG. 1B, the display device DD may be inwardly-bent so that the display surface DD-IS of the first non-bending area NBA1 and the display surface DD-IS of the second non-bending area NBA2 face each other. As illustrated in FIG. 1C, the display device DD may be outwardly-bent so that the display surface DD-IS is exposed to the outside. As illustrated in FIGS. 1A to 1C, the display device capable of being repeatedly bent and unbent may be defined as a flexible display device.

In an exemplary embodiment of the inventive concept, the display device DD may include a plurality of bending areas BA. In addition, the bending area BA may be defined in correspondence to user operation types of the display device DD. For example, the bending area BA may be defined in parallel to the second directional axis DR2 or defined in a diagonal direction, unlike FIGS. 1B and 1C. The bending area BA may have an area that is not fixed and determined according to a curvature radius thereof. In an exemplary embodiment of the inventive concept, the display device DD may be configured to repeat only operation modes in FIGS. 1A and 1B.

Although the foldable display device DD is illustrated in an exemplary embodiment of the inventive concept, the inventive concept is not limited thereto. The display device DD may include a curved display surface or a three-dimensional display surface (polygonal column display surface) including a plurality of display areas indicating different directions from each other. Alternatively, the display device DD according to an exemplary embodiment of the inventive concept may be a flat rigid display module. Alternatively, the display device DD may be a bending-type display module having a bent edge area.

Although the display device DD applied to a mobile phone is illustrated in this exemplary embodiment, the inventive concept is not limited thereto. The display device DD according to an exemplary embodiment of the inventive concept may be used for large-sized electronic devices, such as televisions and monitors, and small and medium-sized electronic devices, such as tablet PCs, navigation units for vehicles, game consoles, and smart watches.

FIGS. 2A to 2D are cross-sectional views illustrating the display device DD according to an exemplary embodiment of the inventive concept. FIGS. 2A to 2D illustrate a cross-section defined by the second directional axis DR2 and the third directional axis DR3. The display device DD in FIGS. 2A to 2D is simply illustrated for explaining a laminated relationship between a functional panel and/or functional units of the display device.

The display device DD according to an exemplary embodiment of the inventive concept may include a display panel, an input sensor, an anti-reflection unit, and a window. At least some of the display panel, the input sensor, the anti-reflection unit, and the window may be provided by a continuous process or may be coupled to each other through an adhesive member. In FIGS. 2A to 2D, a pressure sensitive adhesive film (PSA) is illustrated as an example of the adhesive member. Hereinafter, the adhesive member may include a typical adhesive or sticking agent. However, inventive concept is not particularly limited thereto. In other exemplary embodiments of the inventive concept, the anti-reflection unit may be omitted or replaced by a different component.

In FIGS. 2A to 2D, among the input sensor, the anti-reflection unit, and the window, a component provided with another component through a continuous process is expressed by a "layer". Among the input sensor, the anti-reflection unit, and the window, a component coupled with another component through an adhesive member is expressed by a "panel". The panel may include a base layer providing a base surface, e.g., a synthetic resin film, a composite material film, or a glass substrate. However, the "layer" may not include the base layer. In other words, the above-described units expressed as the "layer" is disposed on a base surface provided by another unit.

The input sensor, the anti-reflection unit, and the window may be referred to as an input sensing panel ISP, an anti-reflection panel RPP, and a window panel WP or an input sensing layer ISL, an anti-reflection layer RPL, and a window layer WL according to whether a base layer is provided.

Figure 2A:
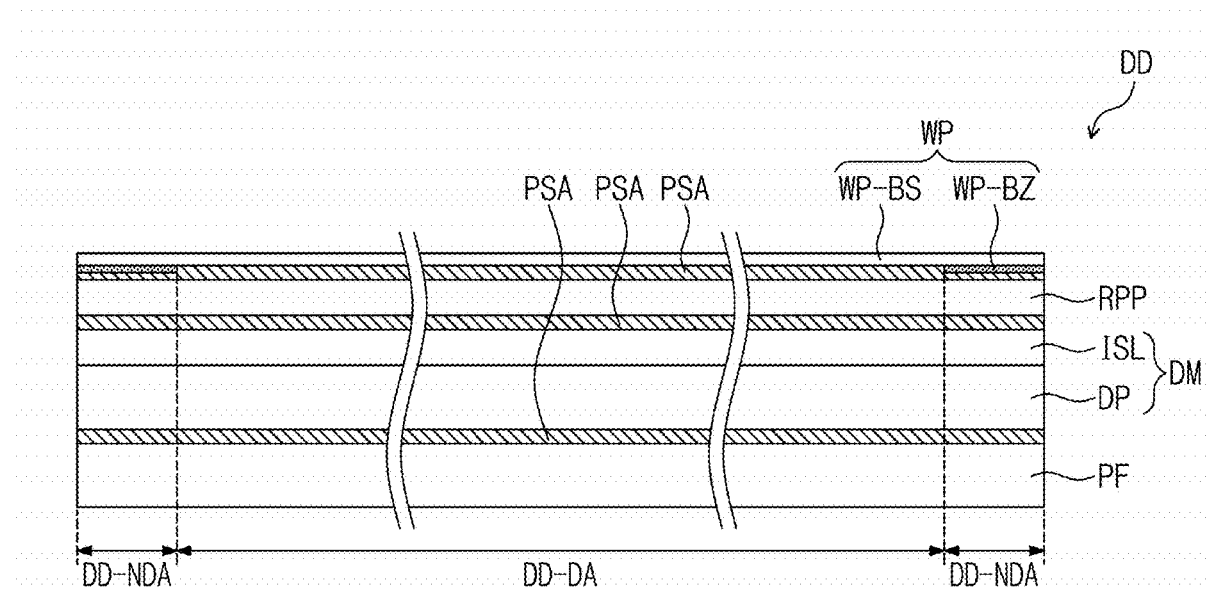
FIGS. 2A, 2B, 2C, and 2D are cross-sectional views illustrating the display device according to an exemplary embodiment of the inventive concept.

As illustrated in FIG. 2A, the display device DD may include a display panel DP, an input sensing layer ISL, an anti-reflection panel RPP, a window panel WP, and a protection member PF. The input sensing layer ISL is disposed directly on the display panel DP. In this specification, an expression "a component B1 is directly disposed on a component A1" represents that an adhesive member is not disposed between the component A1 and the component B1. The component B1 may be provided on a base surface provided by the component A1 through a continuous process after the component A1 is provided.

The display module DM may be defined by including the display panel DP and the input sensing layer ISL disposed directly on the display panel DP. A pressure sensitive adhesive film PSA is disposed between the anti-reflection panel RPP and the window panel WP, between the display module DM and the anti-reflection panel RPP, and between the protection member PF and the display module DM.

The display panel DP generates an image, and the input sensing layer ISL acquires coordinate information of an external input (e.g., a touch event). The protection member PF supports the display panel DP and protects the display panel DP from an external impact.

The protection member PF may include a plastic film as a base layer. The protection member PF may include a plastic film including one selected from the group consisting of polyethylene, polyethyeleneterepthalate (PET), polyethyelene (PE), polyvinylchloride (PVC), polypropylene (PP), polystyrene (PS), polyacrylonitrile (PAN), styrene-acrylonitrile copolymer (SAN), acrylonitrile-butadiene-styrene (ABS), polymethyl methacrylate (PMMA), and a combination thereof. Particularly, polyethyeleneterepthalate (PET) has excellent thermal resistance, fatigue strength, and electrical characteristics and is not significantly affected by temperature and moisture.

A material of the protection member PF is not limited to plastic resins. For example, the protection member PF may include an organic/inorganic composite material. The protection member PF may include a porous organic layer and an inorganic material filled in pores of the organic layer.

Although the display panel DP according to an exemplary embodiment of the inventive concept may be a light emitting display panel, the embodiment of the inventive concept is not limited thereto. For example, the display panel DP may be an organic light emitting display panel or a quantum-dot light emitting display panel. The organic light emitting display panel may include a light emitting layer containing an organic light emitting material. The quantum dot light emitting display panel may include a light emitting layer containing a quantum dot and a quantum rod. Hereinafter, the display panel DP will be described as the organic light emitting display panel.

The anti-reflection panel RPP reduces a reflectance of natural light (or sunlight) that is incident from above the window panel WP. The anti-reflection panel RPP according to an exemplary embodiment of the inventive concept may include a retarder and a polarizer. The retarder may be a film type or a liquid crystal coating type and include a $\lambda/2$ retarder and/or a $\lambda/4$ retarder. The polarizer may also be a film type or a liquid crystal coating type. The film type may include a flexible synthetic resin film, and the liquid crystal coating type may include liquid crystals arranged in a predetermined arrangement. Each of the retarder and the polarizer may is further include a protection film. The retarder and the polarizer themselves or the protection film may be defined as a base layer of the anti-reflection panel RPP.

The anti-reflection panel RPP according to an exemplary embodiment of the inventive concept may include color filters. The color filters have a predetermined arrangement. The arrangement of the color filters may be determined in consideration of emitted colors of pixels of the display panel DP. The anti-reflection panel RPP may further include a black matrix adjacent to the color filters.

The window panel WP according to an exemplary embodiment of the inventive concept includes a base layer WP-BS and a light shielding pattern WP-BZ. The base layer WP-BS may include a glass substrate and/or a synthetic resin film. The base layer WP-BS is not limited to a single layer. The base layer WP-BS may include two or more films that are coupled by an adhesive member.

The light shielding pattern WP-BZ partially overlaps the base member WP-BS. The light shielding pattern WP-BZ may be disposed on a rear surface of the base layer WP-BS to define a bezel area, i.e., the non-display area DD-NDA (refer to FIG. 1A).

The light shielding pattern WP-BZ may be a colored organic layer and provided by, e.g., a coating method. Although not separately shown, the window panel WP may further include a functional coating layer disposed on a front surface of the base layer WP-BS. The functional coating layer may include an anti-fingerprint layer, an anti-reflection layer, and a hard coating layer.

Figure 2B:
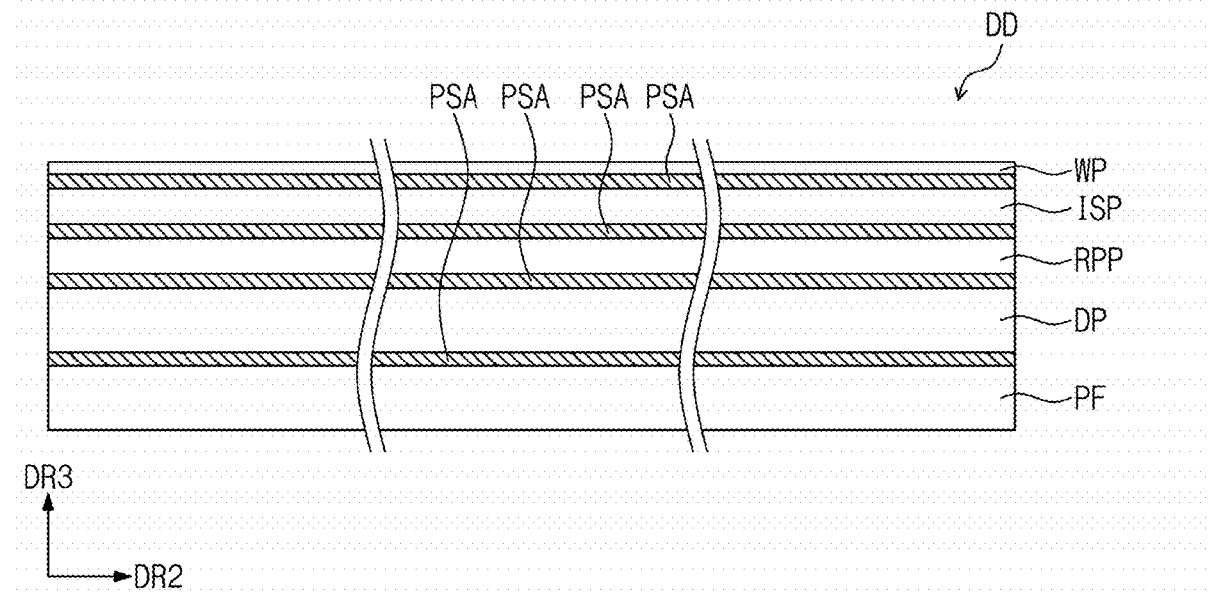
Figure 2C:
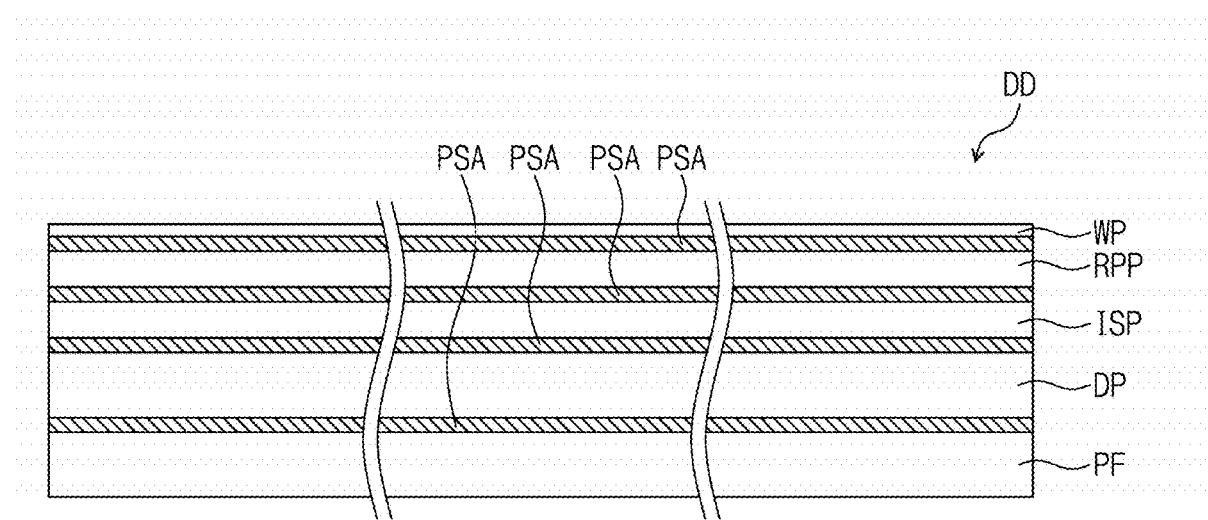
Figure 2D:
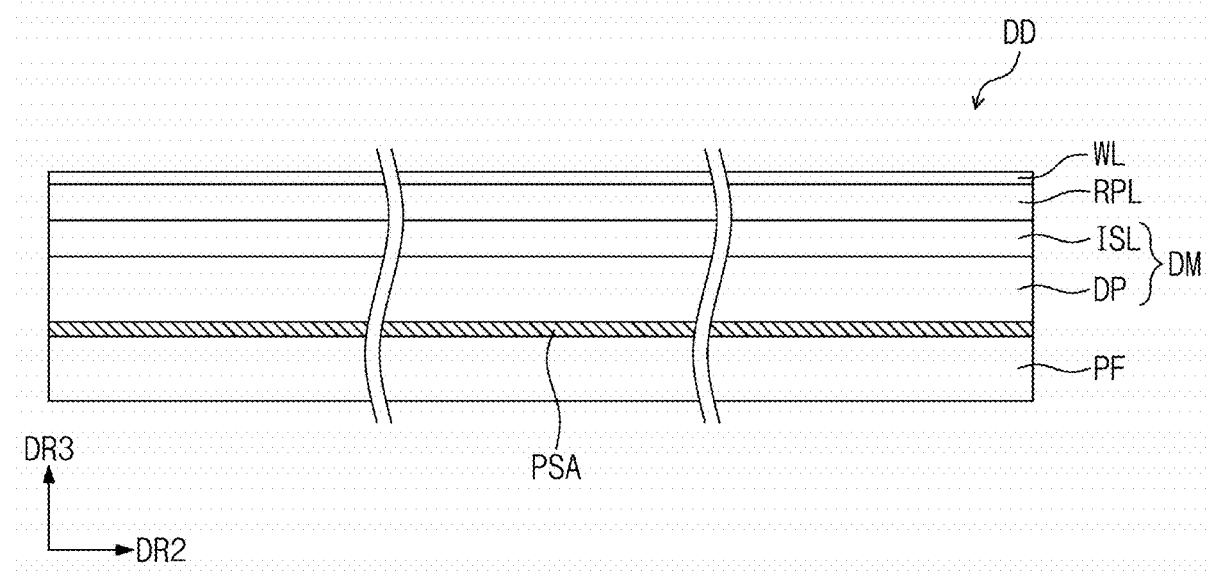

In FIGS. 2B to 2D, each of the window panel WP and the window layer WL is simply illustrated without distinguishing the base layer WP-BS and the light shielding pattern WP-BZ.

As illustrated in FIGS. 2B and 2C, the display device DD may include a protection member PF, a display panel DP, an anti-reflection panel RPP, an input sensing panel ISP, and a window panel WP. A laminated sequence of the input sensing panel ISP and the anti-reflection panel RPP may be changed.

As illustrated in FIG. 2D, the display device DD may include a protection member PF, a display panel DP, an input sensing layer ISL, an anti-reflection layer RPL, and a window layer WL. Adhesive members are omitted from the display device DD, and the input sensing layer ISL, the anti-reflection layer RPL, and the window layer WL may be provided through a continuous process. A laminated sequence of the input sensing layer ISL and the anti-reflection layer RPL may be changed.

Here, the anti-reflection layer RPL may include a liquid crystal coating-type retarder and a liquid crystal coating-type polarizer. Each of the retarder and the polarizer may include a discotic liquid crystal layer having a tilt angle in one side direction.

Figure 3:
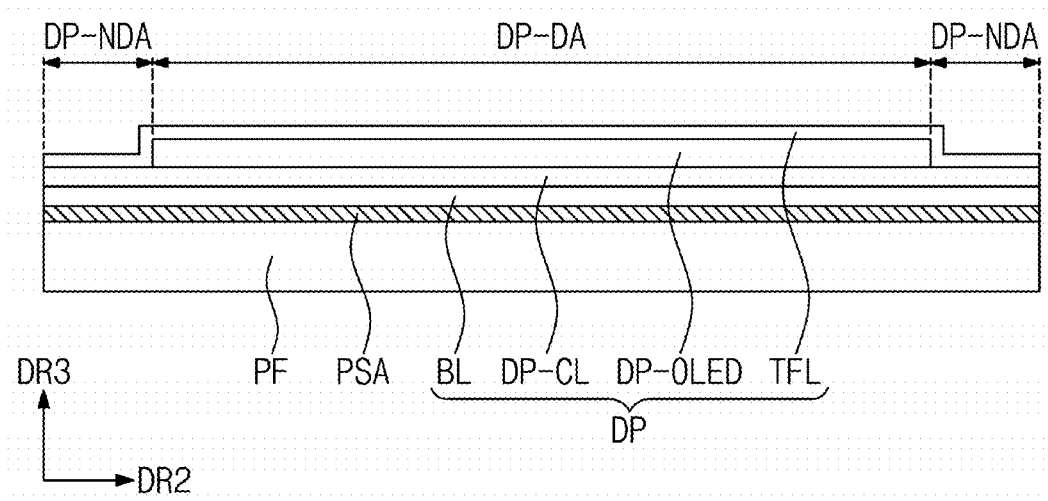
FIG. 3 is a cross-sectional view illustrating a display panel according to an exemplary embodiment of the inventive concept.
Figure 4:
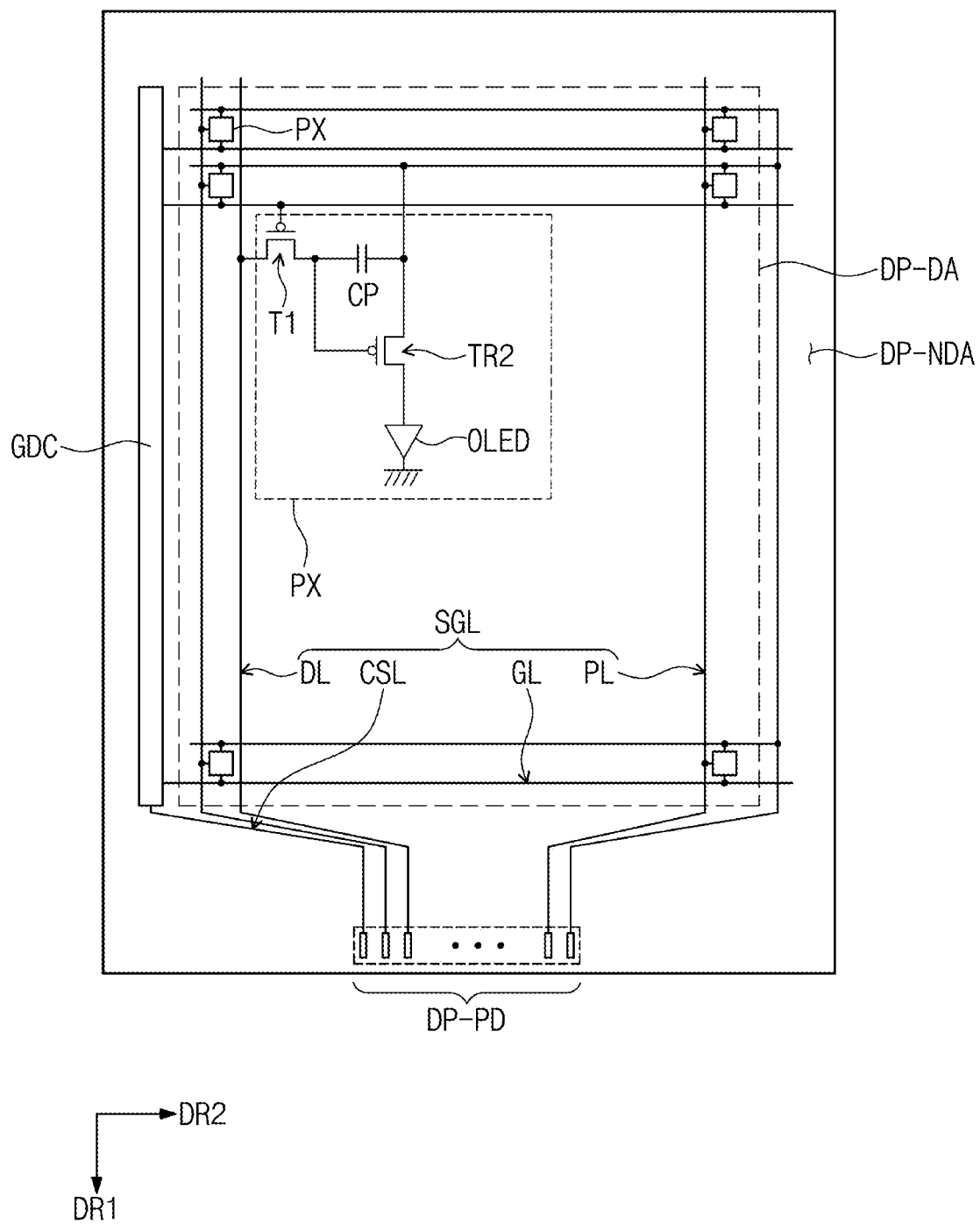
FIG. 4 is a plan view illustrating the display panel according to an exemplary embodiment of the inventive concept.
Figure 5:
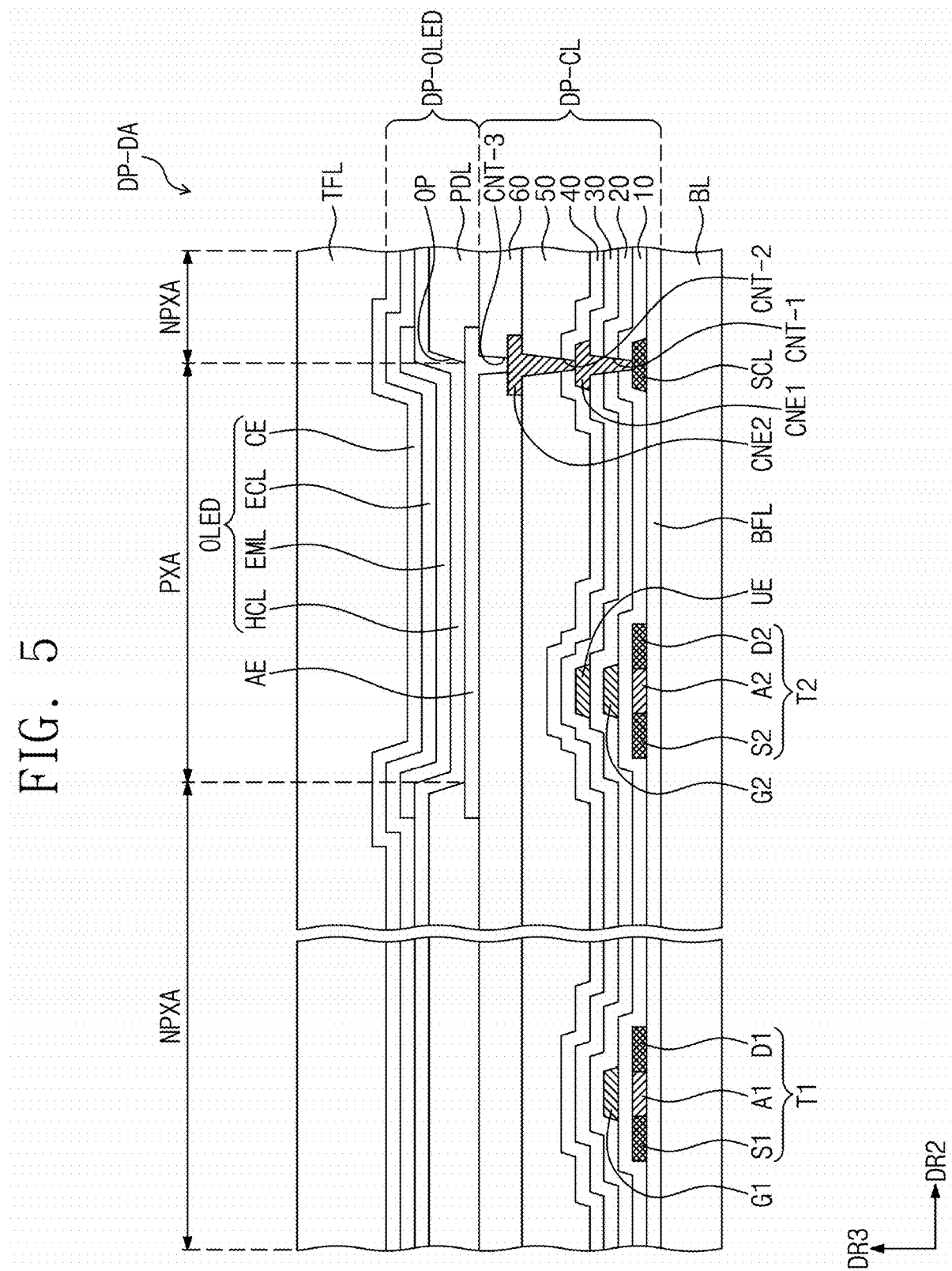
FIG. 5 is a partial cross-sectional view illustrating the display panel corresponding to a pixel in FIG. 4.

FIG. 3 is a cross-sectional view illustrating the display panel DP according to an exemplary embodiment of the inventive concept. FIG. 4 is a plan view illustrating the display panel DP according to an exemplary embodiment of the inventive concept. FIG. 5 is a partial cross-sectional view illustrating the display panel DP corresponding to the pixel PX in FIG. 4. Hereinafter, all of described features of the display panel DP may be applied to the display device DD described with reference to FIGS. 2A to 2D. The protection member PF disposed on a rear surface of the display panel DP is also illustrated in FIG. 4.

As illustrated in FIG. 3, the display panel DP includes a base layer BL, a circuit element layer DP-CL disposed on the base layer BL, a display element layer DP-OLED, and an upper insulation layer TFL.

The base layer BL may include a synthetic resin film. A synthetic resin layer is provided on a working substrate that is used when the display panel DP is manufactured. Thereafter, a conductive layer, an insulation layer, etc., are provided on the synthetic resin layer. When the working substrate is removed, the synthetic resin layer corresponds to the base layer BL. The synthetic resin layer may include a thermosetting resin. Although the synthetic resin layer may include a polyimide-based resin layer, the embodiment of the inventive concept is not limited to the material of the synthetic resin layer. Besides, the base layer BL may include a glass substrate, a metal substrate, or, an organic/inorganic composite substrate.

The circuit element layer DP-CL includes at least one insulation layer and a circuit element. Hereinafter, the insulation layer contained in the circuit element layer DP-CL is referred to as an intermediate insulation layer. The intermediate insulation layer may include at least one intermediate inorganic layer and/or at least one intermediate organic layer. The circuit element includes a signal line and a driving circuit of a pixel. The circuit element layer DP-CL may be provided through a process of forming an insulation layer, a semiconductor layer, and a conductive layer by coating, deposition, etc., and a process of patterning the insulation layer, the semiconductor layer, and the conductive layer by a photolithography process.

The display element layer DP-OLED includes a light emitting element. The display element layer DP-OLED may include organic light emitting diodes. The display element layer DP-OLED may further include an organic layer, such as a pixel defining layer.

The upper insulation layer TFL seals at least the display element layer DP-OLED. The upper insulation layer TFL may include a thin-film encapsulation layer. The upper insulation layer TFL may include another functional thin-film. The thin-film encapsulation layer includes at least one inorganic layer (hereinafter, referred to as an inorganic encapsulation layer). The thin-film encapsulation layer according to an exemplary embodiment of the inventive concept may include at least one organic layer (hereinafter, referred to as an "organic encapsulation layer) and at least one encapsulation inorganic layer.

The inorganic encapsulation layer protects the display element layer DP-OLED from moisture/oxygen, and the organic encapsulation layer protects the display element layer DP-OLED from foreign substances such as dust particles. Although the inorganic encapsulation layer may include a silicon nitride layer, a silicon oxynitride layer, a silicon oxide layer, a titanium oxide layer, or an aluminum oxide layer, the inventive concept is not particularly limited thereto. Although the organic encapsulation layer may include an acrylic-based organic layer, the inventive concept is not particularly limited thereto.

In an exemplary embodiment of the inventive concept, the upper insulation layer TFL may be omitted. The upper insulation layer TFL may be replaced by an encapsulation substrate, such as a glass substrate. The encapsulation substrate may be coupled to the display panel DP by a sealant. The sealant disposed on the non-display area DP-NDA (refer to FIG. 4) may directly couple the glass substrate and the circuit element layer DP-CL.

As illustrated in FIG. 4, the display panel DP may include a driving circuit GDC, a plurality of signal lines SGL (hereinafter, referred to as signal lines), a plurality of signal pads DP-PD (hereinafter, referred to as signal pads), and a plurality of pixels PX (hereinafter, referred to as pixels).

The driving circuit GDC may include a scan driving circuit. The scan driving circuit generates a plurality of scan signals (hereinafter, referred to as "scan signals") and sequentially outputs the scanning signals to a plurality of scan lines GL (hereinafter, referred to as "scan lines"), which will be described later. The scan driving circuit may further output another control signal to the driving circuit of each of the pixels PX.

The scan driving circuit may include a plurality of transistors that are provided through the same process as the driving circuit of each of the pixels PX, e.g., a low temperature polycrystalline silicon (LTPS) process or a low temperature polycrystalline oxide (LTPO) process.

The signal lines SGL includes scan lines GL, data lines DL, a power line PL, and a control signal line CSL. Each of the scan lines GL is connected to the corresponding pixel PX of the pixels PX, and each of the data lines DL is connected to the corresponding pixel PX of the pixels PX. The power line PL is connected to the pixels PX. The control signal line CSL may provide control signals to the scan driving circuit.

The display area DP-DA may be defined as an area on which the pixels PX are disposed. A plurality of electronic elements are disposed on the display area DP-DA.

Each of the electronic elements includes an organic light emitting diode of each of the pixels PX and a pixel driving circuit connected thereto.

The driving circuit GDC, the signal lines SGL, the signal pads DP-PD, and the pixel driving circuit may be contained in the circuit element layer DP-CL in FIG. 3.

For example, the pixel PX may include a first transistor T1, a second transistor T2, a capacitor CP, and an organic light emitting diode OLED. Although the pixel driving circuit is required to include a switching transistor and a driving transistor, the inventive concept is not limited to the exemplary embodiment in FIG. 4. The first transistor T1 is connected to the scan line GL and the data line DL. The organic light emitting diode OLED receives a power voltage provided by the power line PL.

Referring to FIG. 5, the display panel DP may include a plurality of insulation layers, a semiconductor pattern, a conductive pattern, a signal line, etc. The insulation layer, the semiconductor layer, and the conductive layer are provided by a method such as coating and deposition. Thereafter, the insulation layer, the semiconductor layer, and the conductive layer may be selectively patterned by a photolithography method. By using the above-described method, the semiconductor pattern, the conductive pattern, and the signal line contained in the circuit element layer DP-CL and the display element layer DP-OLED are provided.

At least one inorganic layer is provided on a top surface of the base layer BL. The inorganic layer may include at least one of an aluminum oxide, a titanium oxide, a silicon oxide, a silicon oxynitride, a zirconium oxide, and a hafnium oxide. The inorganic layer may have multiple layers. The inorganic layer having multiple layers may provide a barrier layer and/or a buffer layer. In the illustrated exemplary embodiment, the display panel DP includes a buffer layer BFL.

The buffer layer BFL improves a coupling force between the base layer BL and the semiconductor pattern. The buffer layer BFL may include a silicon oxide layer and a silicon nitride layer. The silicon oxide layer and the silicon nitride layer may be alternately laminated.

The semiconductor pattern is disposed on the buffer layer BFL. The semiconductor pattern may include polysilicon. However, the inventive concept is not limited thereto. For example, the semiconductor pattern may include amorphous silicon or a metal oxide.

FIG. 5 merely illustrates a portion of the semiconductor pattern. The semiconductor pattern may be further disposed on another area of the pixel PX on a plane. The semiconductor pattern may be arranged over the pixels PX according to a particular rule. The semiconductor pattern has an electrical property that is different according to whether it is doped or not. The semiconductor pattern may include a doped area and a non-doped area. The doped area may be doped with an N-type dopant or a P-type dopant. A P-type transistor includes a doped area that is doped with a P-type dopant.

The doped area has a conductivity greater than that of the non-doped area, and substantially serves as an electrode or a signal line. The non-doped area substantially corresponds to an active (or channel) of the transistor. In other words, one portion of the semiconductor pattern may be the active area of the transistor, another portion may be a source or a drain of the transistor, and another portion may be a connection electrode or a connection signal line.

As illustrated in FIG. 5, a source S1, an active area A1, and a drain D1 of a first transistor T1 are provided from the semiconductor pattern, and a source S2, an active area A2, and a drain D2 of a second transistor T2 are provided from the semiconductor pattern. The source S1 and S2 and the drain D1 and D2 extend from the active areas A1 and A2 in opposite directions on a cross-section. FIG. 5 illustrates a portion of a connection signal line SCL provided from the semiconductor pattern. Although not separately shown, the connection signal line SCL may be connected to the drain D2 of the second transistor T2 on a plane.

A first insulation layer 10 is disposed on the buffer layer BFL. The first insulation layer 10 overlaps the plurality of pixels PX (refer to FIG. 4) in common and covers the semiconductor pattern. The first insulation layer 10 may be an inorganic layer and/or an organic layer, and have a single-layer or multi-layer structure. The first insulation layer may include at least one of an aluminum oxide, a titanium oxide, a silicon oxide, a silicon oxynitride, a zirconium oxide, or a hafnium oxide. In the illustrated exemplary embodiment, the first insulation layer 10 may be a single-layered silicon oxide layer. In addition to the first insulation layer 10, an insulation layer of the circuit element layer DP-CL, which will be described later, may be an inorganic layer and/or an organic layer, and have a single-layer or multi-layer structure. The inorganic layer may include at least one of the above-described materials.

Gates G1 and G2 are disposed on the first insulation layer 10. The gate G1 may be a portion of a metal pattern. The gates G1 and G2 overlap the active areas A1 and A2, respectively. The gates G1 and G2 serve as masks in a process of doping the semiconductor pattern.

A second insulation layer 20 covering the gates G1 and G2 is disposed on the first insulation layer 10. The second insulation layer 20 overlaps the plurality of pixels PX (refer to FIG. 4) in common. The second insulation layer 20 may be an inorganic layer and/or an organic layer, and have a single-layer or multi-layer structure. In this exemplary embodiment, the second insulation layer 20 may be a single-layered silicon oxide layer.

An upper electrode UE may be disposed on the second insulation layer 20. The upper electrode UE may overlap the gate G2 of the second transistor T2. The upper electrode UE may be a portion of the metal pattern. The capacitor CP (refer to FIG. 4) may be defined by a portion of the gate G2 and the upper electrode UE overlapping the same. In another exemplary embodiment of the inventive concept, the upper electrode UE may be omitted.

A third insulation layer 30 covering the upper electrode UE may be disposed on the second insulation layer 20. In this exemplary embodiment, the third insulation layer 30 may be a single-layered silicon oxide layer. A first connection electrode CNE1 may be disposed on the third insulation layer 30. The first connection electrode CNE1 may be connected to the connection signal line SCL through a contact hole CNT-1 passing through the first to third insulation layers 10 to 30.

A fourth insulation layer 40 is disposed on the third insulation layer 30. The fourth insulation layer 40 may be a single-layered silicon oxide layer. A fifth insulation layer 50 is disposed on the fourth insulation layer 40. The fifth insulation layer 50 may be an organic layer. A second connection electrode CNE2 may be disposed on the fifth insulation layer 50. The second connection electrode CNE2 may be connected to the first connection electrode CNE1 through a contact hole CNT-2 passing through the fourth insulation layer 40 and the fifth insulation layer 50.

A sixth insulation layer 60 covering the second connection electrode CNE2 may be disposed on the fifth insulation layer 50. The sixth insulation layer 60 may be an organic layer. A first electrode AE (or anode) is disposed on the sixth insulation layer 60. The first electrode AE is connected to the second connection electrode CNE2 through a contact hole CNT-3 passing through the sixth insulation layer 60. An opening OP is defined in the pixel defining layer PDL. The opening OP of the pixel defining layer PDL exposes at least a portion of the first electrode AE.

As illustrated in FIG. 5, the display area DP-DA may include a light emitting area PXA and a non-light emitting area NPXA disposed adjacent to the light emitting area PXA. The non-light emitting area NPXA may surround the light emitting area PXA. In this exemplary embodiment, the light emitting area PXA may be defined as corresponding to a portion of the first electrode AE exposed by the opening OP.

A hole control layer HCL may be disposed in common on the light emitting area PXA and the non-light emitting area NPXA. The hole control layer HCL may include a hole transporting layer and a hole injection layer. A light emitting layer EML is disposed on the hole control layer HCL. The light emitting layer EML may be disposed on an area corresponding to the opening OP. That is, the light emitting layer EML may be separately provided on each of the pixels.

An electron control layer ECL is disposed on the light emitting layer EML. The electron control layer ECL may include an electron transporting layer and further include an electron injection layer. The hole control layer HCL and the electron control layer ECL may be provided in common to the plurality of pixels by using an open mask. A second electrode CE is disposed on the electron control layer ECL. The second electrode CE has an integrated shape and is disposed in the plurality of pixels PX (refer to FIG. 4) in common. As illustrated in FIG. 5, an upper insulation layer TFL is disposed on the second electrode CE.

Figure 6:
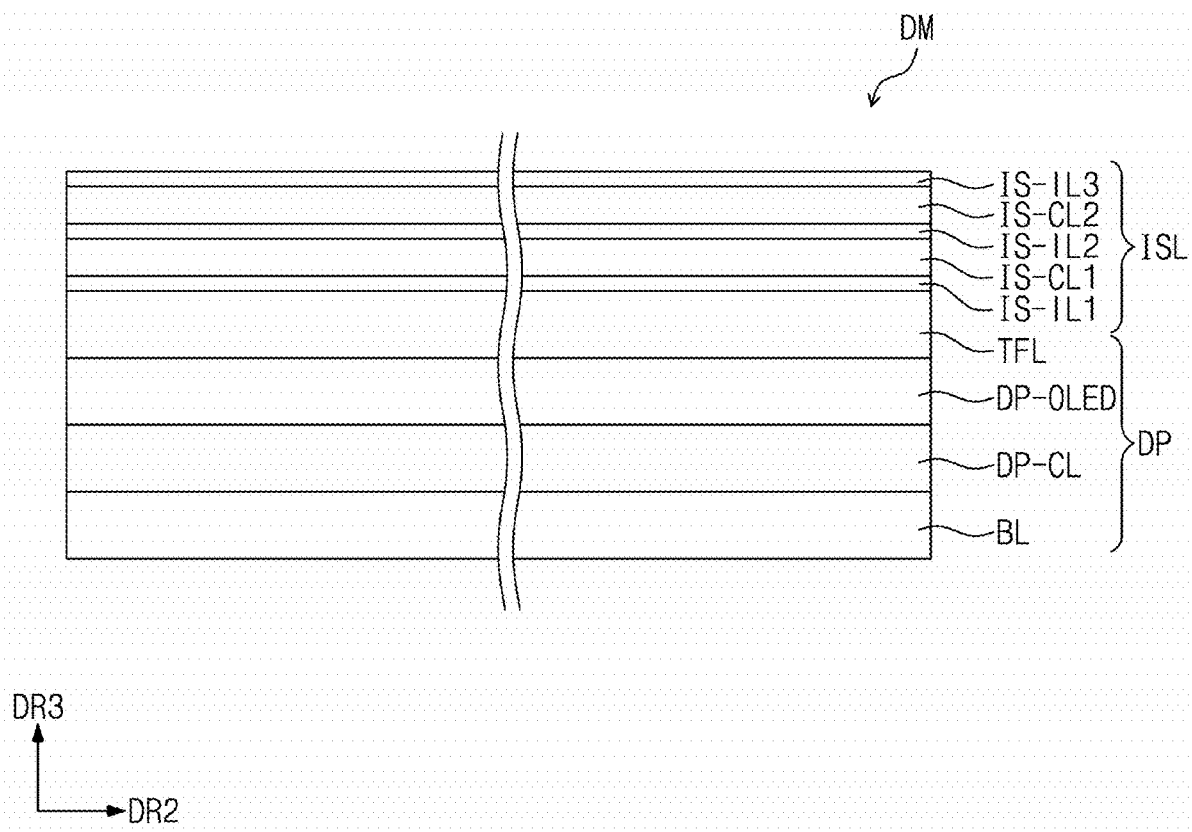
FIG. 6 is a cross-sectional view illustrating a display module according to an exemplary embodiment of the inventive concept.
Figure 7:
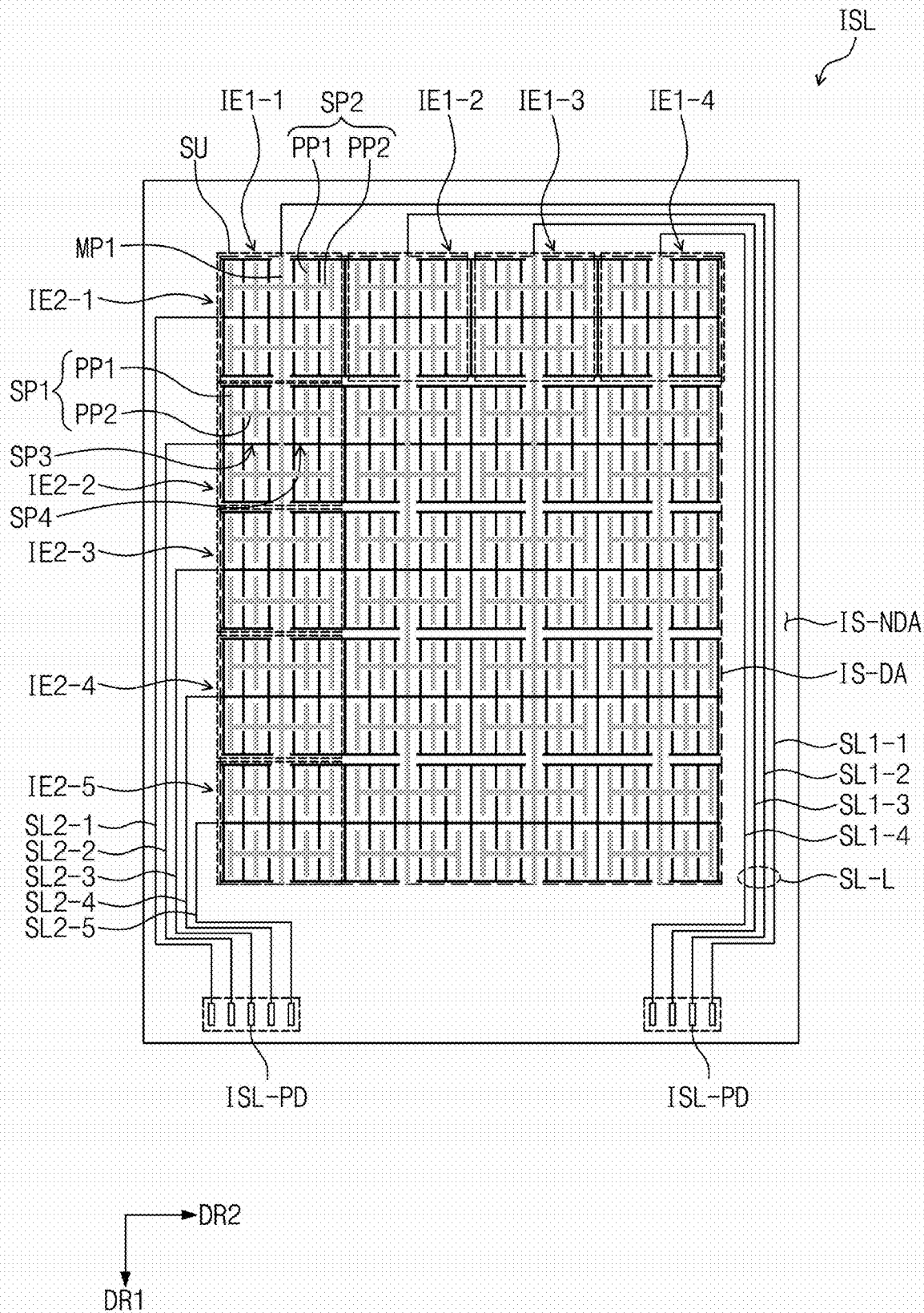
FIG. 7 is a plan view illustrating an input sensor according to an exemplary embodiment of the inventive concept.

FIG. 6 is a cross-sectional view illustrating the display module DM according to an exemplary embodiment of the inventive concept. FIG. 7 is a plan view illustrating an input sensing layer ISL according to an exemplary embodiment of the inventive concept.

FIGS. 6 and 7 exemplarily illustrate a "layer"-type input sensor described with reference to FIGS. 2A to 2D. The input sensor having the "panel"-type or the "layer"-type may have a multilayer structure. The input sensor may include a sensing electrode, a signal line connected to the sensing electrode, and at least one insulation layer. For example, the input sensor may detect an external input in a capacitive manner.

As illustrated in FIG. 6, the input sensing layer ISL may include a first insulation layer IS-IL1 (or first sensor insulation layer), a first conductive layer IS-CL1, a second insulation layer IS-IL2 (or second sensor insulation layer), a second conductive layer IS-CL2, and a third insulation layer IS-IL3 (or third sensor insulation layer). The first insulation layer IS-IL1 may be directly disposed on the upper insulation layer TFL. In an exemplary embodiment of the inventive concept, the first insulation layer IS-IL1 and/or the third insulation layer IS-IL3 may be omitted.

Each of the first conductive layer IS-CL1 and the second conductive layer IS-CL2 may have a single-layer structure or a multi-layer structure laminated in a third directional axis DR3. The conductive layer having the multi-layer structure may include at least two of transparent conductive layers and the metal layers. The conductive layer having the multi-layer structure may include metal layers including different metal from each other. The transparent conductive layer may include an indium tin oxide (ITO), an indium zinc oxide (IZO), a zinc oxide (ZnO), an indium tin zinc oxide (ITZO), PEDOT, a metal nano-wire, and graphene. The metal layer may include molybdenum, silver, titanium, copper, aluminum, and an alloy thereof. For example, each of the first conductive layer IS-CL1 and the second conductive layer IS-CL2 may have a three-layer structure of titanium/aluminum/titanium. Metal having high durability and a high reflectance may be applied to an outer layer, and metal having a high electric conductivity may be applied to an inner layer.

Each of the first conductive layer IS-CL1 and the second conductive layer IS-CL2 includes a plurality of conductive patterns. Hereinafter, the first conductive layer IS-CL1 includes first conductive patterns, and the second conductive layer IS-CL2 includes second conductive patterns. Each of the first conductive patterns and the second conductive patterns may include sensing electrodes and signal lines connected thereto.

Each of the first insulation layers IS-IL1 to the third insulation layer IS-IL3 may include an inorganic layer or an organic layer. In this exemplary embodiment, each of the first insulation layer IS-IL1 and the second insulation layer IS-IL2 may be an inorganic layer. The inorganic layer may include at least one of an aluminum oxide, a titanium oxide, a silicon oxide, a silicon oxynitride, a zirconium oxide, or a hafnium oxide. The third insulation layer IS-IL3 may include an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyimide-based resin, or a perylene-based resin.

In this exemplary embodiment, the second insulation layer IS-IL2 may cover a sensing area IS-DA that will be described later. That is, the second insulation layer IS-IL2 may entirely overlap the sensing area IS-DA. Although not separately shown, the second insulation layer IS-IL2 may include a plurality of insulation patterns in an embodiment of the inventive concept.

As illustrated in FIG. 7, the input sensing layer ISL may include first electrodes IE1-1 to IE1-4, first signal lines SL1-1 to SL1-4 connected to the first electrodes IE1-1 to IE1-4, second electrodes IE2-1 to IE2-5, and second signal lines SL2-1 to SL2-5 connected to the second electrodes IE2-1 to IE2-5. The first signal lines SL1-1 to SL1-4 and the second signal lines SL2-1 to SL2-5 may be connected to signal pads ISL-PD.

The first electrodes IE1-1 to IE1-4 and the second electrodes IE2-1 to IE2-5 cross each other. The first electrodes IE1-1 to IE1-4 each have a shape extending in the first direction DR1 and are arranged in the second direction DR2. The second electrodes IE2-1 to IE2-5 each have a shape extending in the second direction DR2 and are arranged in the first direction DR1. An external input may be detected by a mutual cap method. Also, a coordinate of an external input may be calculated in the mutual cap method during a first section and then re-calculated in a self cap method during a second section.

Figure 8A:
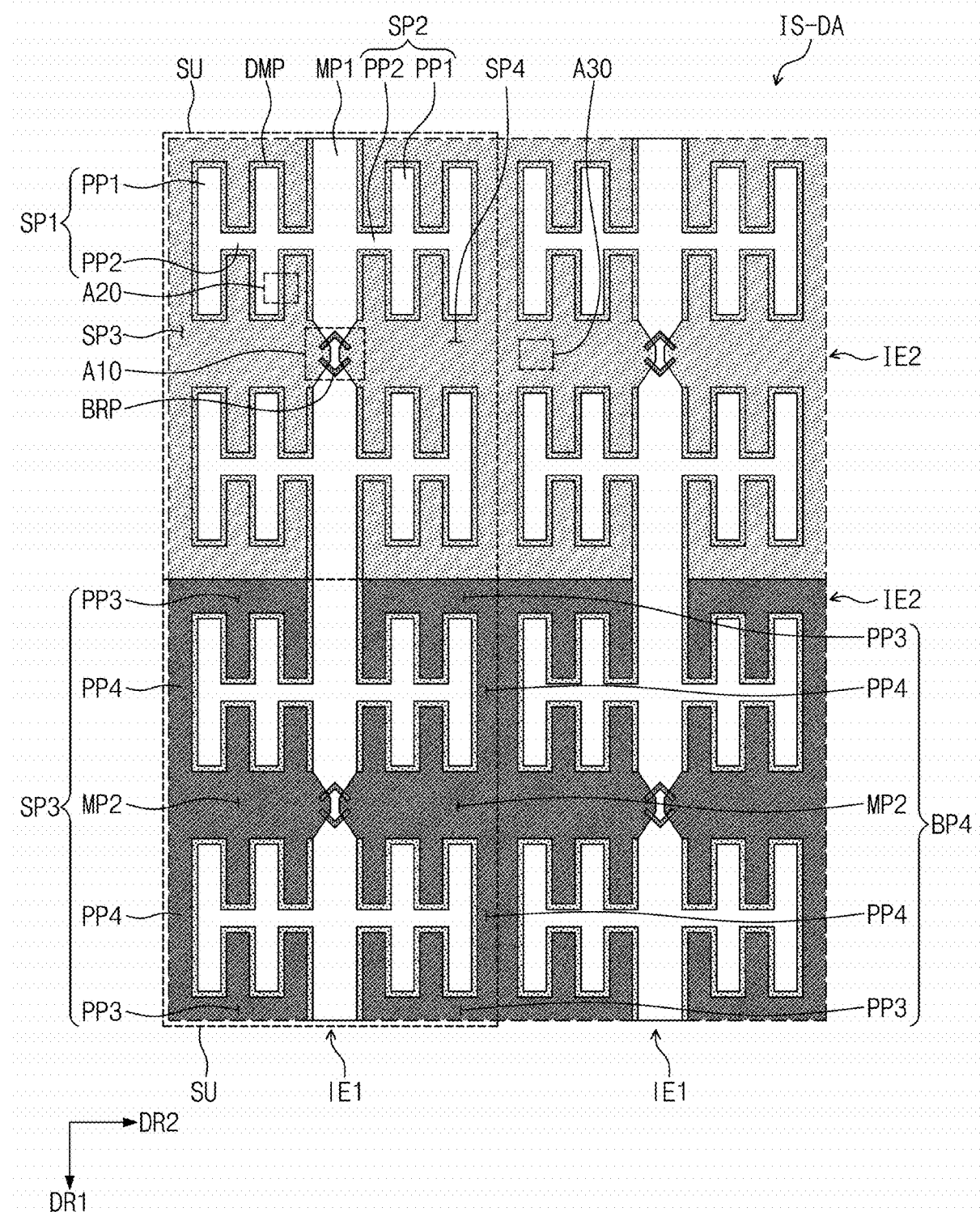
FIG. 8A is an enlarged plan view illustrating a portion of the input sensor according to an exemplary embodiment of the inventive concept.
Figure 8B:
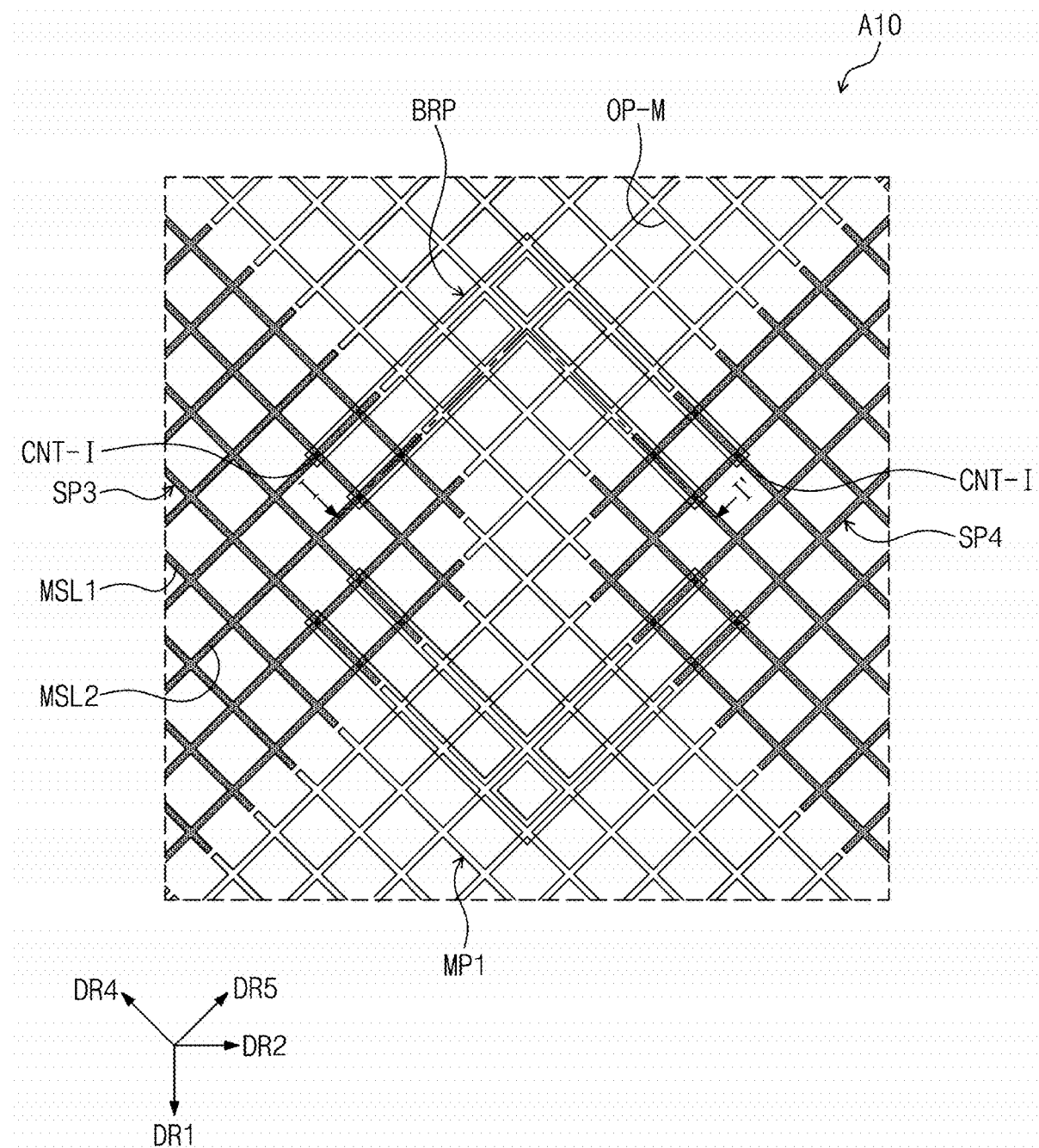
FIG. 8B is an enlarged plan view illustrating one cross area of the input sensor according to an exemplary embodiment of the inventive concept.
Figure 8C:
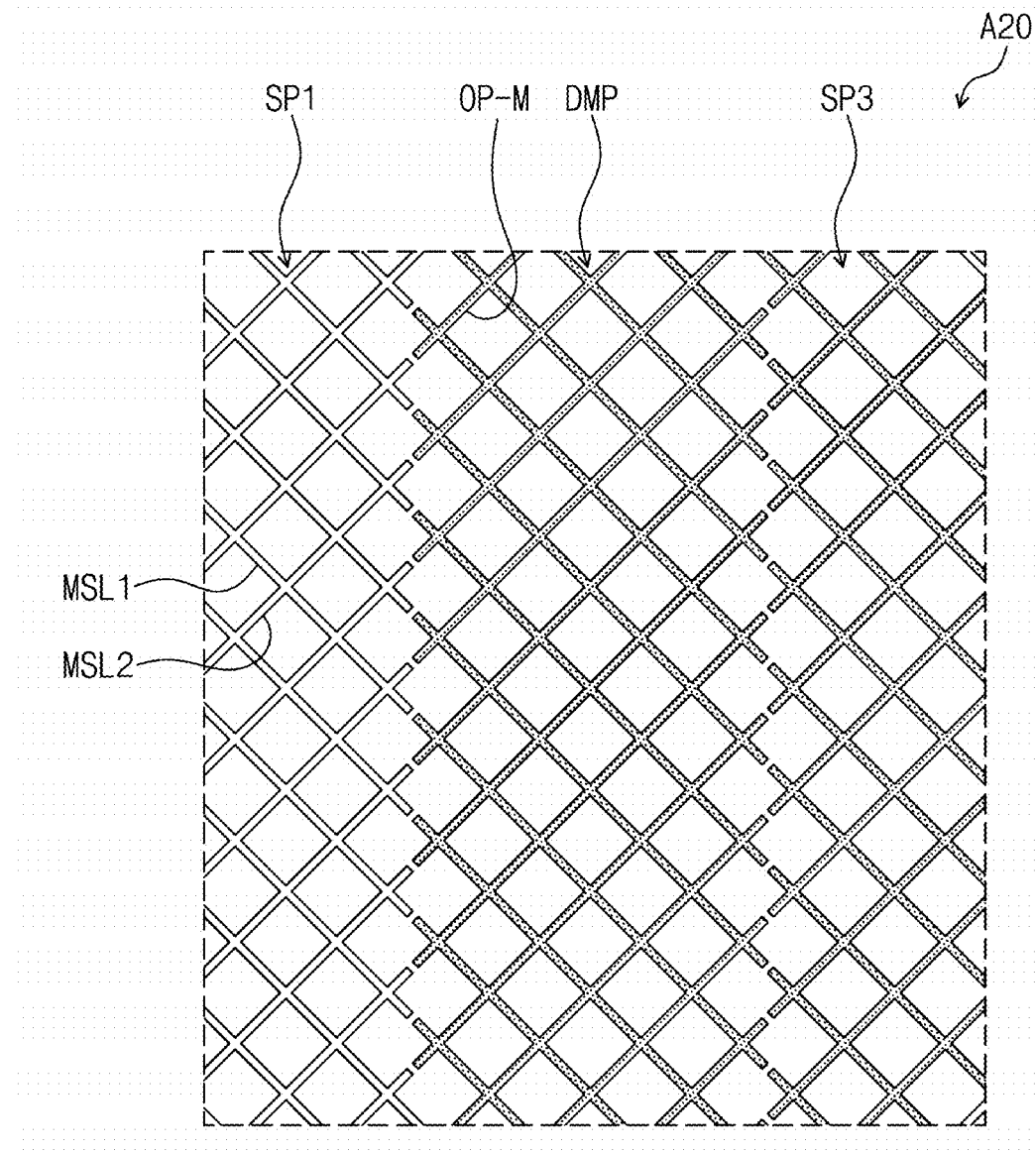
FIG. 8C is an enlarged plan view illustrating one cross area of the input sensor according to an exemplary embodiment of the inventive concept.
Figure 8D:
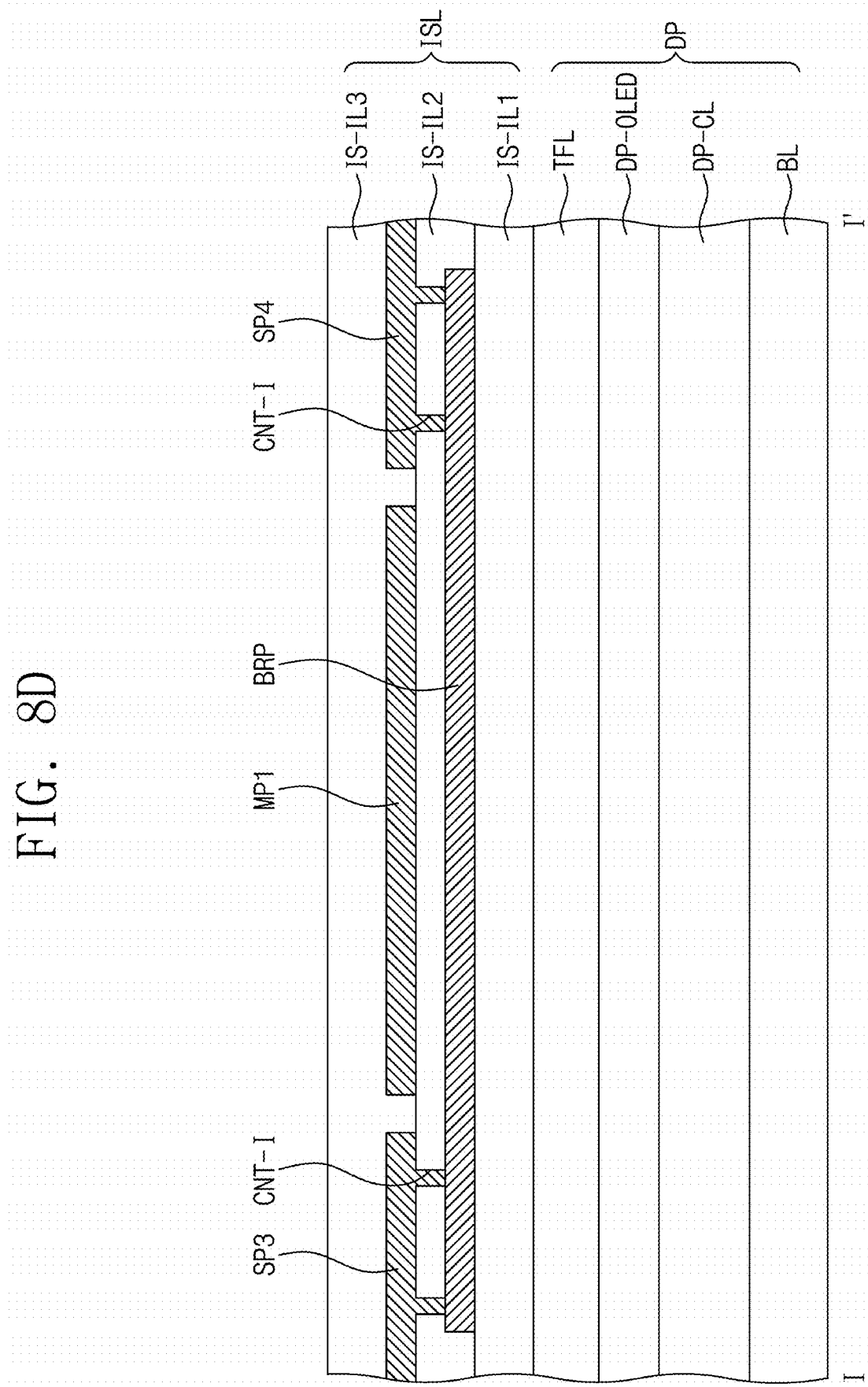
FIG. 8D is a cross-sectional view illustrating a partial area of FIG. 8B.
Figure 8E:
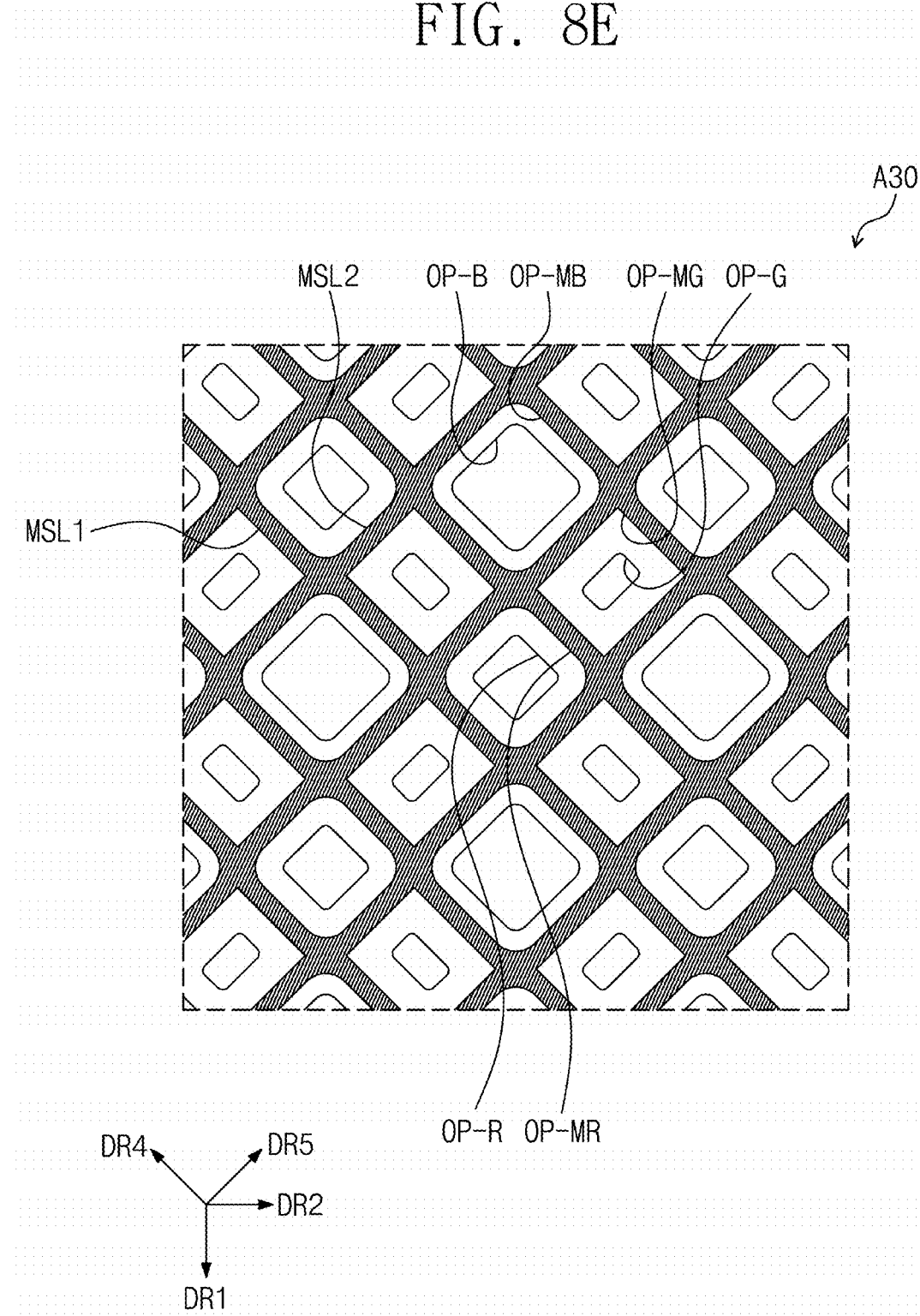
FIG. 8E is an enlarged plan view illustrating a partial area of FIG. 8A.
Figure 8G:
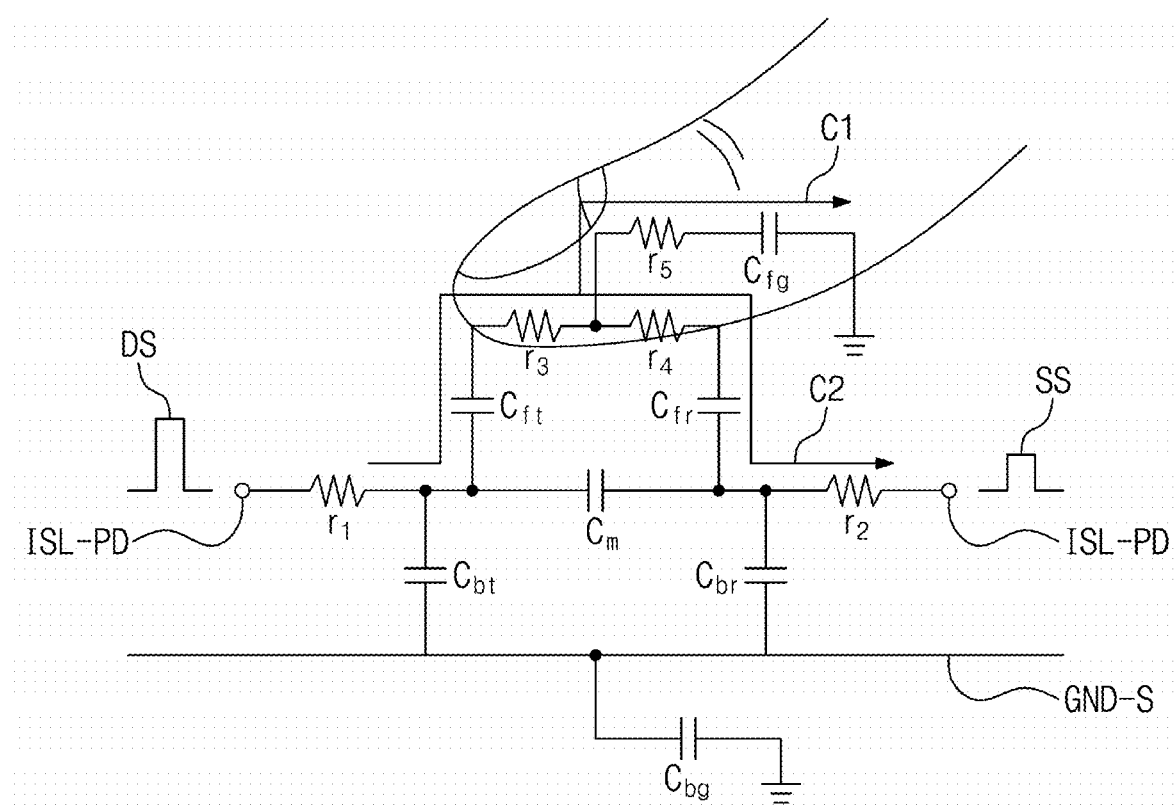
FIG. 8G is an equivalent circuit diagram illustrating the input sensor in a state in which a touch event is generated.

When an external input is detected by the mutual cap method, the first electrodes IE1-1 to IE1-4 may receive a driving signal DS (refer to FIG. 8G). An input sensor detection circuit (not shown) may read a capacitance variance through the second electrodes IE2-1 to IE2-5. The input sensor detection circuit may include a microprocessor.

The first electrodes IE1-1 to IE1-4 include a first main portion MP1 extending in the first direction DR1 and first sensing portions SP1 and second sensing portions SP2, which are spaced with the first main portion MP1 therebetween in the second direction DR2 and each of which extends from the first main portion MP1.

Each of the first sensing portions SP1 and the second sensing portions SP2 may include first sub-portions PP1 extending in the first direction DR1 and first middle portions PP2 disposed between the first sub-portions PP1 or disposed between the first main portion MP1 and one of the first sub-portions PP1. In FIG. 7, the first sensing electrodes IE1-1 to IE1-4, each including two first sensing portions SP1 and two second sensing portions SP2 with respect to each of the second electrodes IE2-1 to IE2-5, are exemplarily illustrated.

Each of the second electrodes IE2-1 to IE2-5 includes a third sensing portion SP3 disposed at one side of the first main portion MP1 in the second direction DR2 and a fourth sensing portion SP4 disposed at the other side of the first main portion MP1 in the second direction DR2. Each of the second electrodes IE2-1 to IE2-5 includes a plurality of third sensing portions SP3 and a plurality of fourth sensing portions SP4. One third sensing portion SP3 and one fourth sensing portion SP4 are provided in one pair, and the one pair is disposed on each of the first electrodes IE1-1 to IE1-4. Referring to two adjacent first electrodes IE1-2 and IE1-3, the fourth sensing portion SP4 disposed in correspondence to one first electrode IE1-2 extends from the third sensing portion SP3 disposed in correspondence to the other first electrode IE1-3.

Referring to FIG. 7, the sensing area IS-DA may be classified into a plurality of sensing areas SU. Each of the plurality of sensing areas SU has the same area as each other. Each of the plurality of sensing areas SU includes a corresponding cross area of cross areas of the first electrodes IE1-1 to IE1-4 and the second electrodes IE2-1 to IE2-5.

Although the input sensor in which the entire sensing area IS-DA includes only the plurality of sensing areas SU is exemplarily illustrated in this embodiment, the inventive concept is not limited thereto. For example, only a partial area of the sensing area IS-DA May include the plurality of sensing areas SU. In other words, the sensing area IS-DA may include another area that is distinguished from the sensing areas SU. The another sensing area that is distinguished from the sensing areas SU may be disposed outside the sensing areas SU.

FIG. 8A is an enlarged plan view illustrating a portion of the input sensor according to an exemplary embodiment of the inventive concept. FIG. 8B is an enlarged plan view illustrating one cross area A10 of the input sensor according to an exemplary embodiment of the inventive concept. FIG. 8C is an enlarged plan view illustrating one cross area A20 of the input sensor according to an exemplary embodiment of the inventive concept. FIG. 8D is a cross-sectional view illustrating a partial area of FIG. 8B. FIG. 8E is an enlarged plan view illustrating a partial area A30 of FIG. 8A. FIG. 8F is a view illustrating an electric field generated between a first electrode IE1 and a second electrode IE2. FIG. 8G is an equivalent circuit diagram illustrating the input sensor in a state in which a touch event is generated.

Hereinafter, the input sensor will be described in detail with reference to FIGS. 8A to 8G. A detailed description on the same component as the input sensing layer ISL described with reference to FIGS. 6 to 7 will be omitted.

FIG. 8A illustrates the input sensor corresponding to four adjacent sensing areas SU in detail. The third sensing portion SP3 surrounds at least one first sensing portion SP1 of the first sensing portions SP1. The third sensing portion SP3 surrounds first sub-portions PP1 . The fourth sensing portion SP4 surrounds at least one second sensing portion SP2 of the second sensing portions SP2.

The third sensing portion SP3 includes a second main portion MP2 disposed between the first sensing portions SP1 in the first direction DR1, second sub-portions PP3 disposed outside the first sensing portions SP1 in the first direction DR1, and second middle portions PP4 disposed between the second main portion MP2 and the second sub-portion PP3.

The fourth sensing portion SP4 has a shape similar to the third sensing portion SP3. The third sensing portion SP3 and the fourth sensing portion SP4 may be symmetric with respect to the first main portion MP1.

The third sensing portion SP3 is spaced relatively far from the first sensing portions SP1. The input sensor may further include a dummy electrode DMP disposed on a spaced area between the third sensing portion SP3 and the first sensing portions SP1. The dummy electrode DMP may surround the first sensing portions SP1. The dummy electrode DMP may be disposed between the fourth sensing portion SP4 and the second sensing portions SP2. The dummy electrode DMP may be further disposed on the third sensing portion SP3 and between the fourth sensing portion SP4 and the first main portion MP1. The dummy electrode DMP may be an electrically-isolated floating electrode.

A length of an edge, at which the third sensing portion SP3 faces the first sensing portions SP1 corresponding thereto, increases. A length of an edge, at which the fourth sensing portion SP4 faces the second sensing portions SP2 corresponding thereto, increases. As a result, a length of an edge, at which the first electrode IE1 faces the second electrode IE2, increases.

In each of the sensing areas SU, an occupied area of the first electrode IE1 and the second electrode IE2 increases, and an area of the floating electrodes relatively decreases. This is because the dummy electrode DMP is disposed on only a spaced area between the first electrode IE1 and the second electrode IE2 instead of being disposed at an inside of the first electrode IE1 and the second electrode IE2.

The dummy electrode DMP may be omitted, as illustrated in FIG. 7. However, as the spaced area between the first electrode IE1 and the second electrode IE2 has a different reflectance from other areas, a phenomenon in which the spaced area is seen may occur. Here, the dummy electrode DMP may prevent the spaced area from being seen.

As illustrated in FIGS. 8B and 8C, the first electrode IE1, the second electrode IE2, and the dummy electrode DMP may have a mesh shape. The first main portion MP1, the first sensing portion SP1, the third sensing portion SP3, and the fourth sensing portion SP4, which are exemplarily illustrated, may include mesh lines MSL1 and MSL2. The mesh lines MSL1 and MSL2 are conductive lines. The mesh lines MSL1 and MSL2 may include lines MSL1 extending in a fourth direction DR4 crossing the first direction DR1 and the second direction DR2 and lines MSL2 extending in a fifth direction DR3 crossing the first direction DR1, the second direction DR2, and the fourth direction DR4. The mesh lines MSL1 and MSL2 may define a plurality of openings OP-M.

As illustrated in FIGS. 8B and 8C, when a cut area of the mesh lines MSL1 and MSL2 is referred to, a gap therebetween may be several μm or less. For example, the gap may be in a range from about 1 μm to about 10 μm, more particularly in a range from about 2 μm to about 4 μm. Since a boundary between electrodes is distinguished as the mesh lines are separated (or cut), a gap of the cut area of the mesh lines MSL1 and MSL2 is extremely narrow.

As illustrated in FIGS. 8B and 8D, each of the second electrodes IE2 includes a bridge BRP disposed on a different layer from the third sensing portion SP3 and the fourth sensing portion SP4 to connect the third sensing portion SP3 and the fourth sensing portion SP4. The bridge BRP overlaps the first main portion MP1. The input sensor, in which two bridges BRP are disposed on each of the sensing areas SU, is exemplarily illustrated.

The bridge BRP may be connected to the third sensing portion SP3 and the fourth sensing portion SP4 through contact holes CNT-1 passing through the second insulation layer IS-20 IL2. Although not separately shown, the first main portion MP1 may be partially removed to reduce an overlapped area with the bridge BRP.

Referring to FIG. 8E, openings OP-MR, OP-MG, and OP-MB having various shapes and different areas from each other are illustrated, unlike the opening OP-M in FIG. 8B. A portion of the third sensing portion SP3 is enlargedly illustrated as a representative of the first electrode IE1, the second electrode IE2, and the dummy electrode DMP. Three-types of openings OP-MG, OP-MR, and OP-MB are defined in the third sensing portion SP3. The three-types of openings OP-MG, OP-MR, and OP-MB correspond to three-types of light emitting openings OP-G, OP-R, and OP-B. The three-types of light emitting openings OP-G, OP-R, and OP-B are defined in the same manner as the light emitting opening OP of the pixel defining layer PDL in FIG. 5. Also, each of the mesh lines MSL1 and MSL2 may not have the straight line shape illustrated in FIG. 8B.

The mesh lines MSL1 and MSL2 may include a disconnected area under a condition of defining an electrode. For example, one mesh line MSL1 disposed between one opening OP-MB and another opening OP-MG of the three-types of openings OP-MG, OP-MR, and OP-MB may be partially disconnected. Also, the other mesh line MSL2 disposed between one opening OP-MB and another opening OP-MG may be partially disconnected.

The three-types of light emitting openings OP-G, OP-R, and OP-B are distinguished according to areas thereof, and each of a first-type opening OP-G, a second-type opening OP-R, and a third-type opening OP-B has an area proportional to a light emitting area of a corresponding pixel.

As illustrated in FIG. 8F, an electric field is generated between the first electrode IE1 and the second electrode IE2. The electric field is varied by a touch event, and this causes a variance of a capacitance. A portion EF1 (hereinafter, referred to as an ineffective electric field) of the electric field is not related to a variance ($\Delta C_m$) of the capacitance. The variance of the capacitance represents a different value before and after the touch event of the capacitance provided between the first electrode IE1 and the second electrode IE2 is generated. A portion EF2 (hereinafter, referred to as an effective electric field) of the electric field is related to the variance of the capacitance.

In the illustrated exemplary embodiment, as the gap between the first electrode IE1 and the second electrode IE2 relatively increases, an intensity of the ineffective electric field EF1 may be reduced. As illustrated in FIG. 8F, an adhesive member PSA contacting the first electrode IE1 and the second electrode IE2 typically corresponds to a dielectric layer having a variable dielectric constant that is sensitive to an external environment. Although the dielectric constant of the adhesive member PSA varies sensitively to the external environment, the capacitance, which is related to the ineffective electric field EF1 as in the illustrated exemplary embodiment, has a low ratio with respect to the entire capacitance between the first electrode IE1 and the second electrode IE2. Thus, the capacitance (C m) between the first electrode and the second electrode may be insensitive to the external environment and maintain a constant value. As a result, a malfunction of the input sensor may be reduced, and a sensing sensitivity may improve.

As described with reference to FIGS. 8A to 8E, although the gap between the first electrode IE1 and the second electrode IE2 relatively increases, an area of the first electrode IE1 and the second electrode IE2 for a unit area relatively increases. Also, the length of the edge, at which the first electrode IE1 faces the second electrode IE2, increases. A reduced intensity of the effective electric field EF2, which is caused as the gap between the first electrode IE1 and the second electrode IE2 increases, may be compensated. According to the illustrated embodiment, an increased intensity of the effective electric field EF2, which is caused by the length of the edge at which the first electrode IE1 faces the second electrode IE2, is greater than the reduced intensity of the effective electric field EF2, which is caused as the gap between the first electrode IE1 and the second electrode IE2 increases.

As illustrated in FIG. 8G, when a touch event is generated, a mutual capacitance ($C_m$) defined between the first electrode IE1 (refer to FIG. 8A) and the second electrode IE2 (refer to FIG. 8A) at a point, at which the touch event is generated, is varied. Referring to FIG. 8G, as the touch event is generated, a capacitance (hereinafter, referred to as a touch capacitance) is provided between both terminals of the mutual capacitance ($C_m$). Also, a capacitance $C_{fg}$ (hereinafter, referred to as a finger capacitance) is provided between an input unit and the ground.

The microprocessor may read-out a sensing signal SS from the other electrode and measure a variance of the capacitance generated before and after the input unit is inputted from the sensing signal SS. The variance of the capacitance may be measured by detecting a current change of the sensing signal SS. According to the illustrated exemplary embodiment, since the finger capacitance $C_{fg}$ is relatively large, the variance of the capacitance has a large value. Thus, the sensing sensitivity improves.

The touch capacitance may include two capacitances $C_{ft}$ and $C_{fr}$ that are connected in series. One $C_{ft}$ of the touch capacitances $C_{ft}$ and $C_{fr}$ is provided between the input unit (e.g., fingers) and one of the first electrode IE1 and the second electrode IE2, which is applied with a driving signal DS, and the other is provided between the input unit and the other of the first electrode IE1 and the second electrode IE2.

In FIG. 8G, capacitances $C_{bt}$ and $C_{br}$ between a system ground GND-S and each of the first electrode IE1 and the second electrode IE2 and a capacitance Cbg between the system ground GND-S and the ground are additionally illustrated. The system ground GND-S may be the second electrode CE in FIG. 5 or a voltage level corresponding thereto. Also, in FIG. 8G, an equivalent resistance $r_1$ between some signal pads ISL-PD and one electrode applied with the driving signal DS, an equivalent resistance $r_2$ between other signal pads ISL-PD and another electrode, and equivalent resistances $r_3$, $r_4$, and $r_5$ provided by the input unit.

Referring to FIGS. 2A to 2D, as a distance between a top surface of the input sensor and a top surface of the window decreases, the touch capacitance $C_{ft}$ and $C_{fr}$ increases. As the distance between the top surface of the input sensor and the top surface of the window decreases, a signal movement through a first path C1 in FIG. 8G decreases, and a signal movement through a second path C2 in FIG. 8G increases. This may cause a malfunction of the input sensor. According to this exemplary embodiment, since an intensity of the current through the first path C1 is much greater than an intensity of the current through the second path C2, the malfunction may be prevented.

According to the input sensor in FIGS. 8A to 8E, the mutual capacitance $C_m$, may increase because the length of the edge, at which the third sensing portion SP3 faces the first sensing portion SP1 corresponding thereto, increases.

Referring to FIG. 8A, the first electrode IE1 has an area less than the second electrode IE2 in one sensing area SA. Thus, one capacitance $C_{ft}$ in FIG. 8G may relatively decrease. The capacitance $C_{ft}$ defined by the first electrode IE1 among the two capacitances $C_{ft}$ and $C_{fr}$ gives a greater influence on generation of a noise (i.e., re-transmission) in consideration of a signal flow. As the capacitance $C_{ft}$ decreases, the noise may decrease.

FIGS. 9 to 15 are enlarged plan views illustrating a portion of the input sensor according to an exemplary embodiment of the inventive concept. FIGS. 9 to 15 illustrate a portion corresponding to FIG. 8A. Hereinafter, detailed description regarding the same component as that described with reference to FIGS. 7 to 8G will be omitted.

Figure 9:
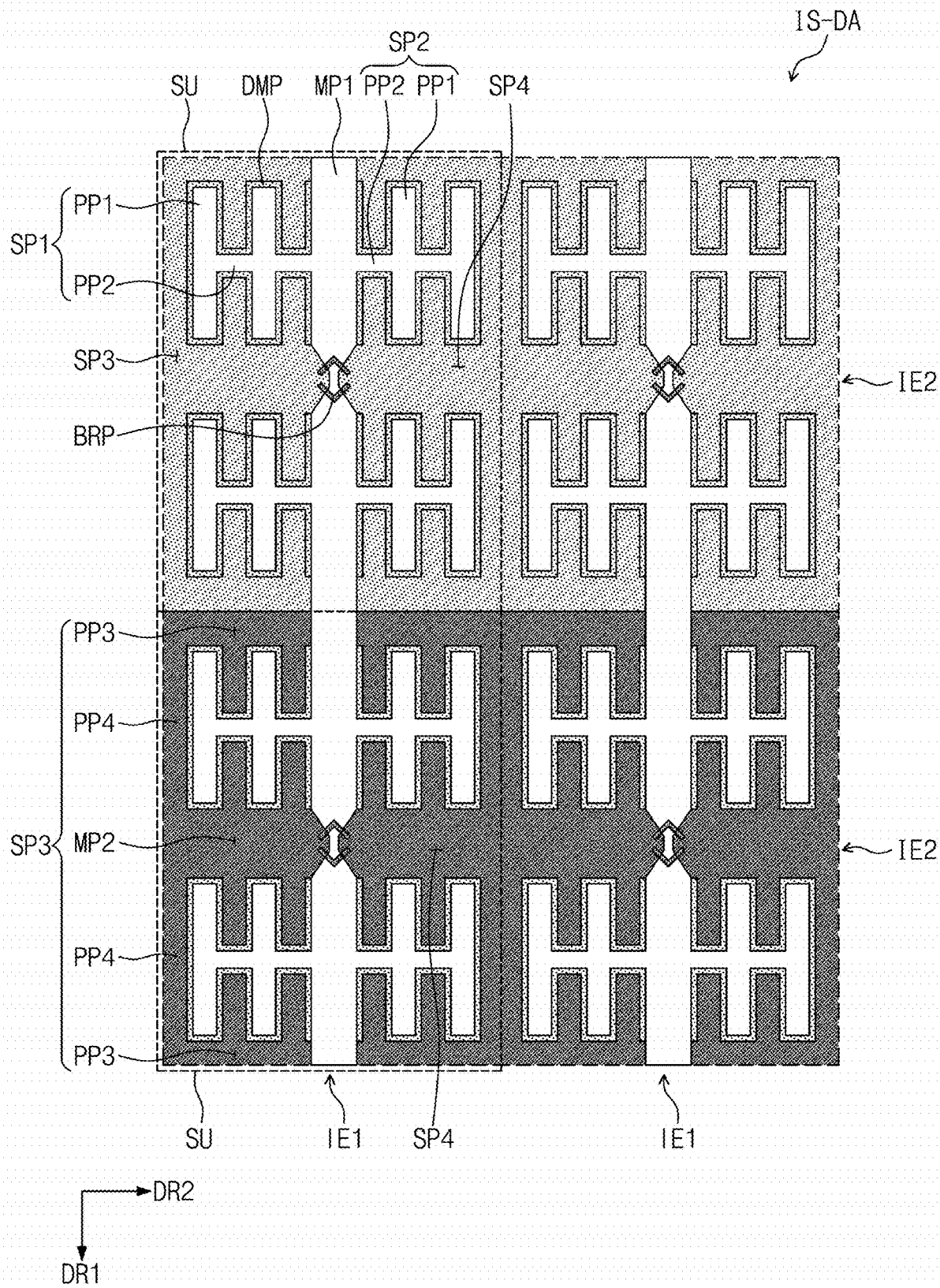
FIGS. 9, 10, 11, 12, 13, 14, and 15 are enlarged plan views illustrating a portion of the input sensor according to an exemplary embodiment of the inventive concept.
Figure 10:
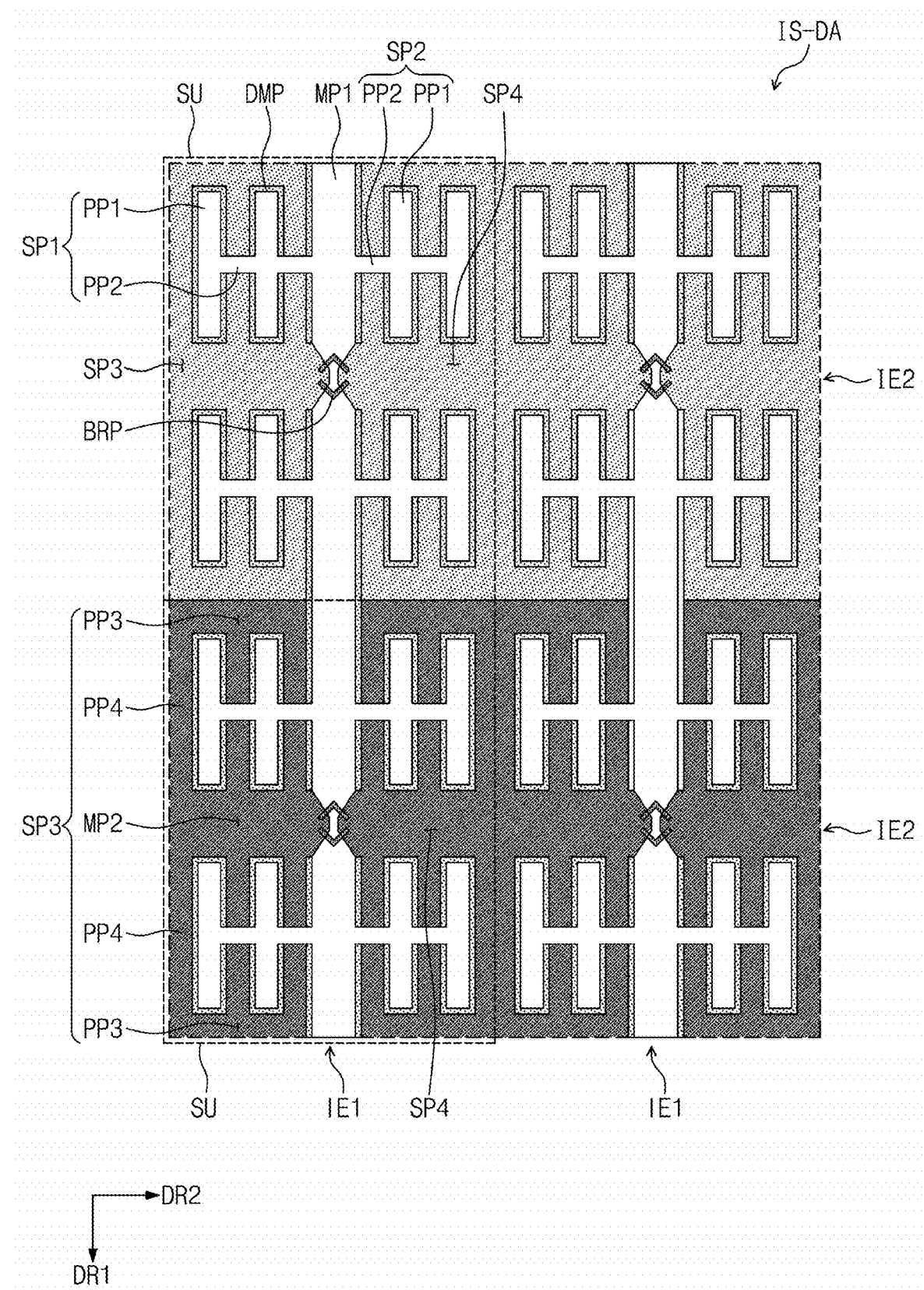

Referring to FIGS. 9 and 10, the shape of the dummy electrode DMP may be varied. Referring to FIG. 9, the dummy electrodes DMP are disposed in correspondence to the first sensing portions SP1, respectively, and separated from each other. Also, the dummy electrodes DMP are disposed in correspondence to the second sensing portions SP2, respectively, and separated from each other.

Referring to FIG. 10, the dummy electrodes DMP are disposed in correspondence to the first sub-portions PP1, respectively, and surround the first sub-portions PP1. The dummy electrodes DMP are separated from each other. The dummy electrodes DMP may not be disposed between the first middle portions PP2 and the third sensing portion SP3 or the fourth sensing portion SP4.

Figure 11:
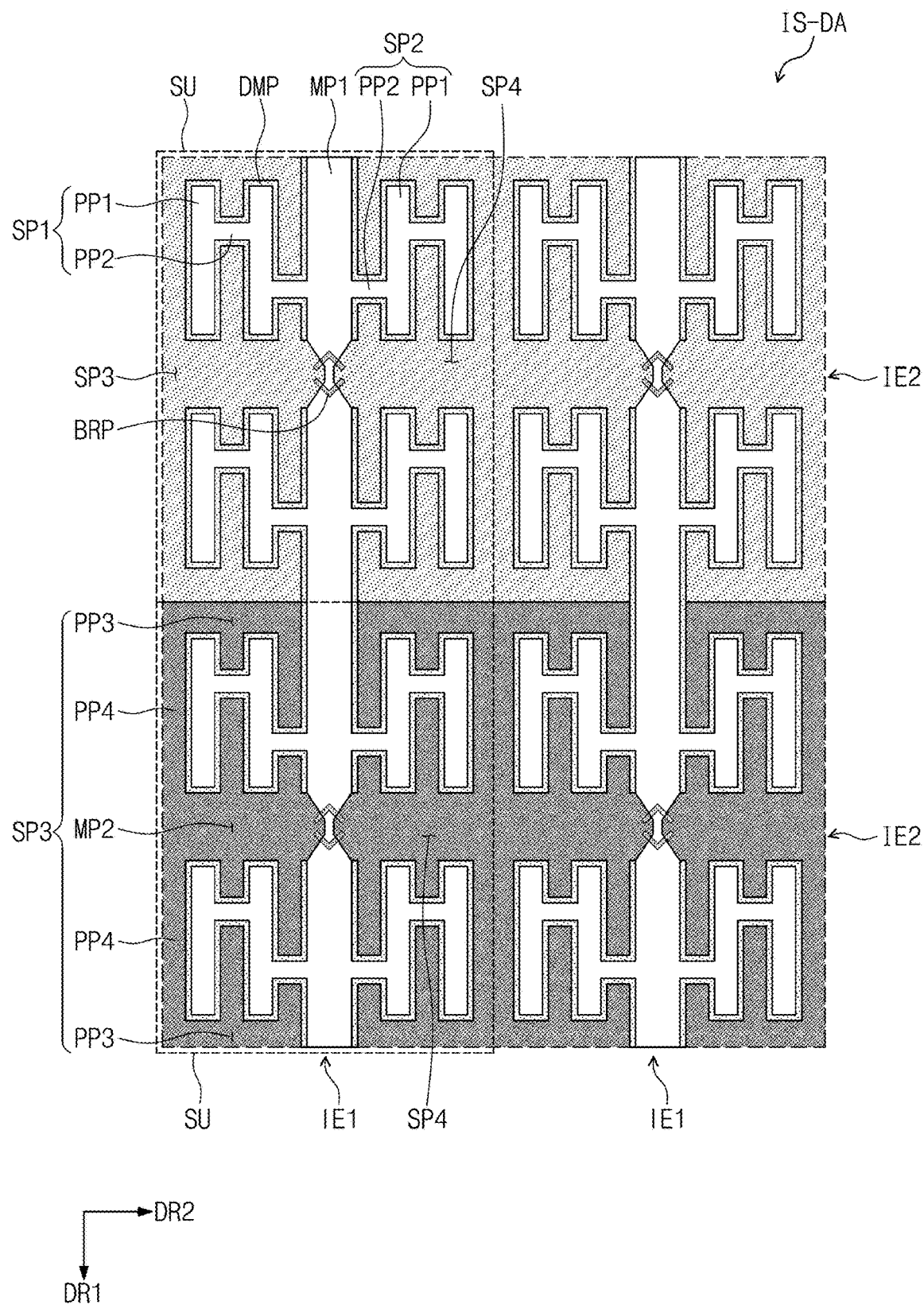

Referring to FIG. 11, the first middle portions PP2 may not be aligned in the second direction DR2. The first middle portions PP2 connecting the first sub-portions PP1 and the first middle portions PP2 disposed between the first sub-portion PP1 and the first main portion MP1 may not be disposed on the same line.

Figure 12:
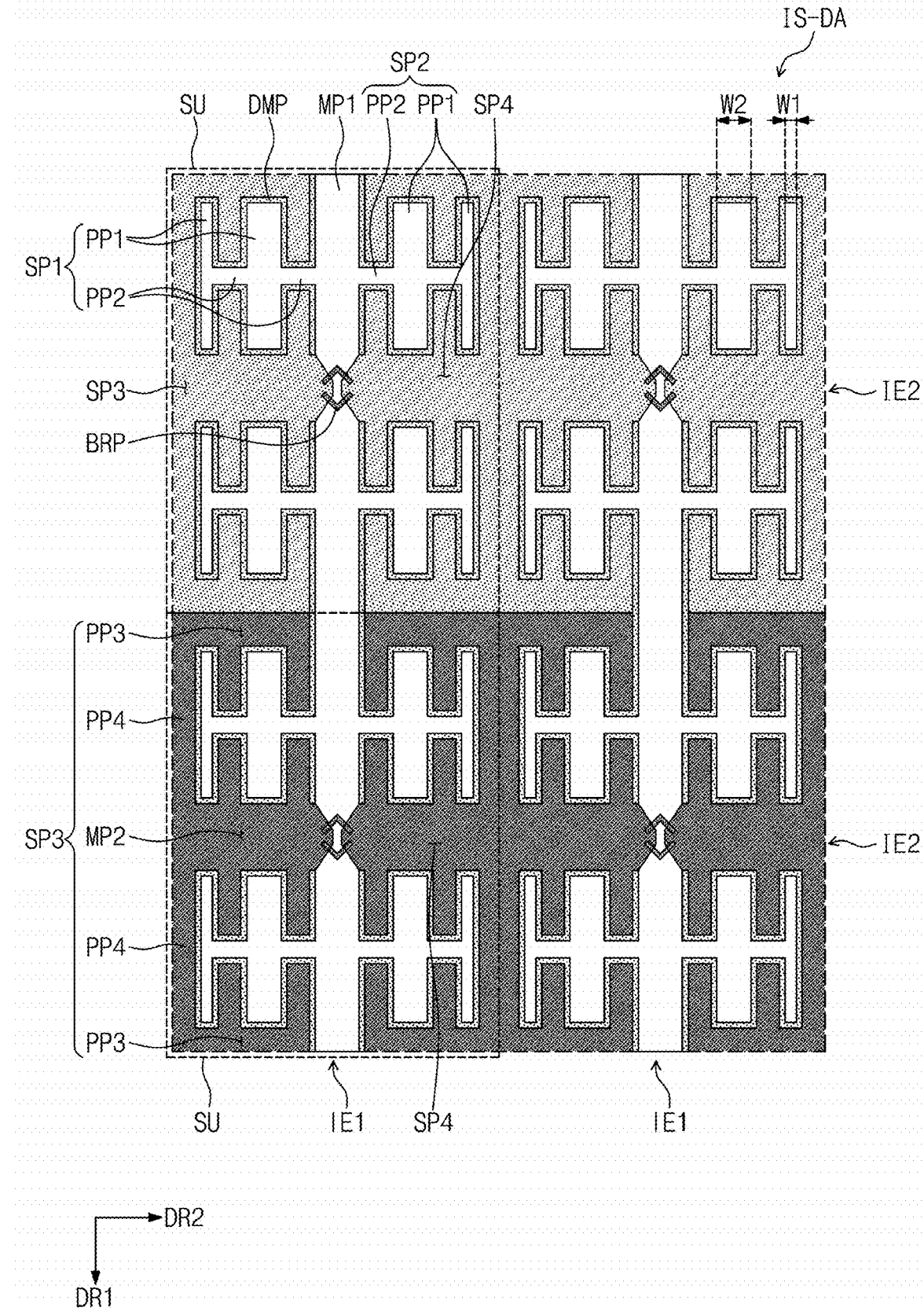

Referring to FIG. 12, the first sub-portions PP1 may have different widths in the second direction DR2. As illustrated, a width W1 of the first sub-portion PP1 spaced far from the first main portion MP1 among the first sub-portions PP1 may be less than a width W2 of the first sub-portion PP1 adjacent to the first main portion MP1. Alternatively, a relationship between the widths W1 and W2 may be opposite to that in FIG. 12.

Figure 13:
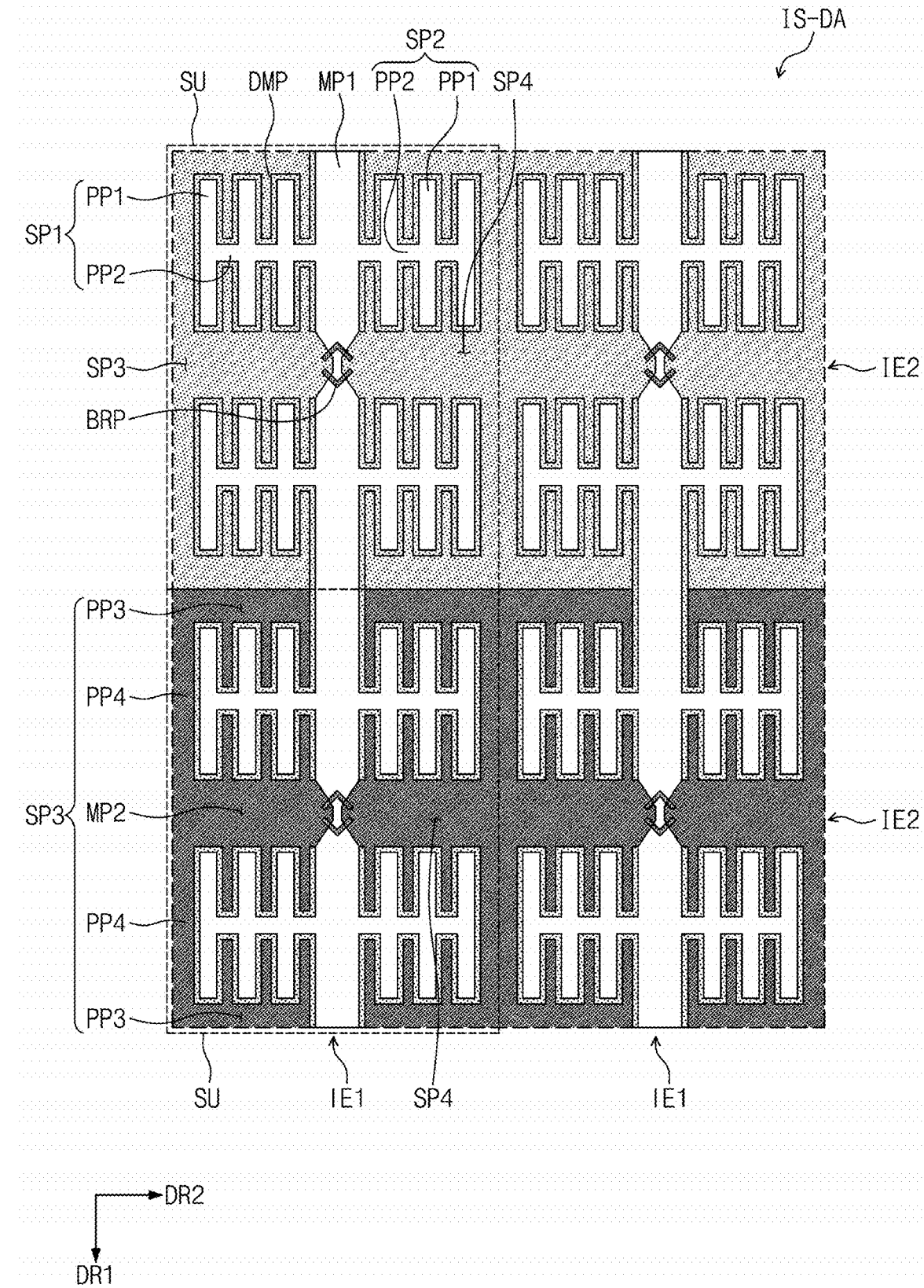

Referring to FIG. 13, the number of the first sub-portions PP1 contained in each of the first sensing portions SP1 and the second sensing portions SP2 may be varied. Each of the first sensing portions SP1 and the second sensing portions SP2 may include three first sub-portions PP1.

Figure 14:
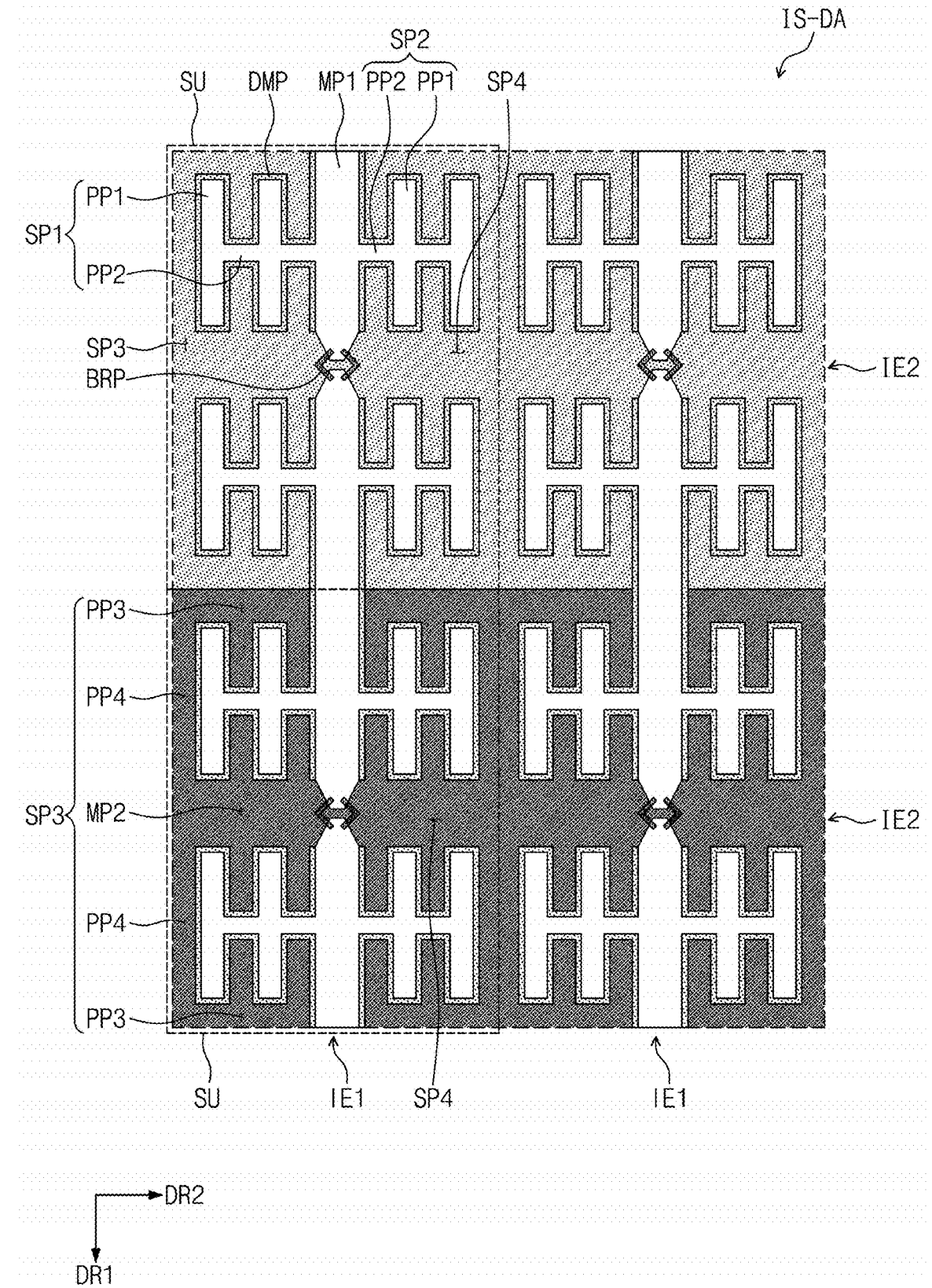

Referring to FIG. 14, the bridge BRP may constitute the first electrode TEL The first main portion MP1 may be provided in plurality. Three first main portions MP1 are exemplarily illustrated in FIG. 14. A plurality of first main portions MP1 are arranged in the first direction DR1. The bridge BRP may connect two adjacent first main portions MP1 of the plurality of first main portions MP1. Here, a signal line may be connected to both ends of each of the first electrode IE1-1 to IE1-4 in FIG. 7. The bridge BRP is disposed on a different layer from the plurality of first main portions MP1.

The first sensing portions SP1 and the second sensing portions SP2 are disposed with the corresponding main portion of the three first main portions MP1 in the second direction DR2 therebetween. Two first sensing portions SP1 and two second sensing portions SP2 are disposed at both sides of the first main portion MP1 disposed at a center of the three first main portions MP1.

Two first sensing portions SP1 corresponding to the first main portion MP1 disposed at the center are surrounded by different second electrodes IE2, and two second sensing portions SP2 corresponding to second first main portion MP1 are surrounded by different second electrodes IE2. The upper first sensing portion SP1 and the upper second sensing portion SP2, which correspond to the first main portion MP1 disposed at the center, are surrounded by the upper second electrode IE2 of the two second electrodes IE2. The lower first sensing portion SP1 and the lower second sensing portion SP2, which correspond to the first main portion MP1 disposed at the center, are surrounded by the lower second electrode IE2 of the two second electrodes IE2.

One first sensing portion SP1 and one second sensing portion SP2, which correspond to the first main portion MP1 disposed at the center, are surrounded by the upper second electrode IE2 of the two second electrodes IE2. Also, one first sensing portion SP1 and one second sensing portion SP2, which correspond to the first main portion MP1 disposed at a lower side, are surrounded by the lower second electrode IE2 of the two second electrodes IE2.

The second electrode IE2 may include a second main portion MP2 having an integrated shape. The second electrode IE2 includes second sub-portions PP3 and second middle portions PP4 disposed between the second main portion MP2 and the second sub-portion PP3. A portion of the second middle portions PP4 is disposed between the first sensing portion SP1 and the second sensing portion SP2, which are adjacent thereto. Here, the first sensing portion SP1 and the second sensing portion SP2 correspond to portions of different first electrodes TEL In an exemplary embodiment of the inventive concept, unlike as illustrated in FIG. 7, each of the second electrodes IE2-1 to IE2-5 may have a length greater than that of each of the first electrodes IE1-1 to IE1-4. As illustrated in FIG. 7, the signal line may be connected to one end of each of the first electrodes IE1-1 to IE1-4 and second electrodes IE2-1 to IE2-5.

Figure 15:
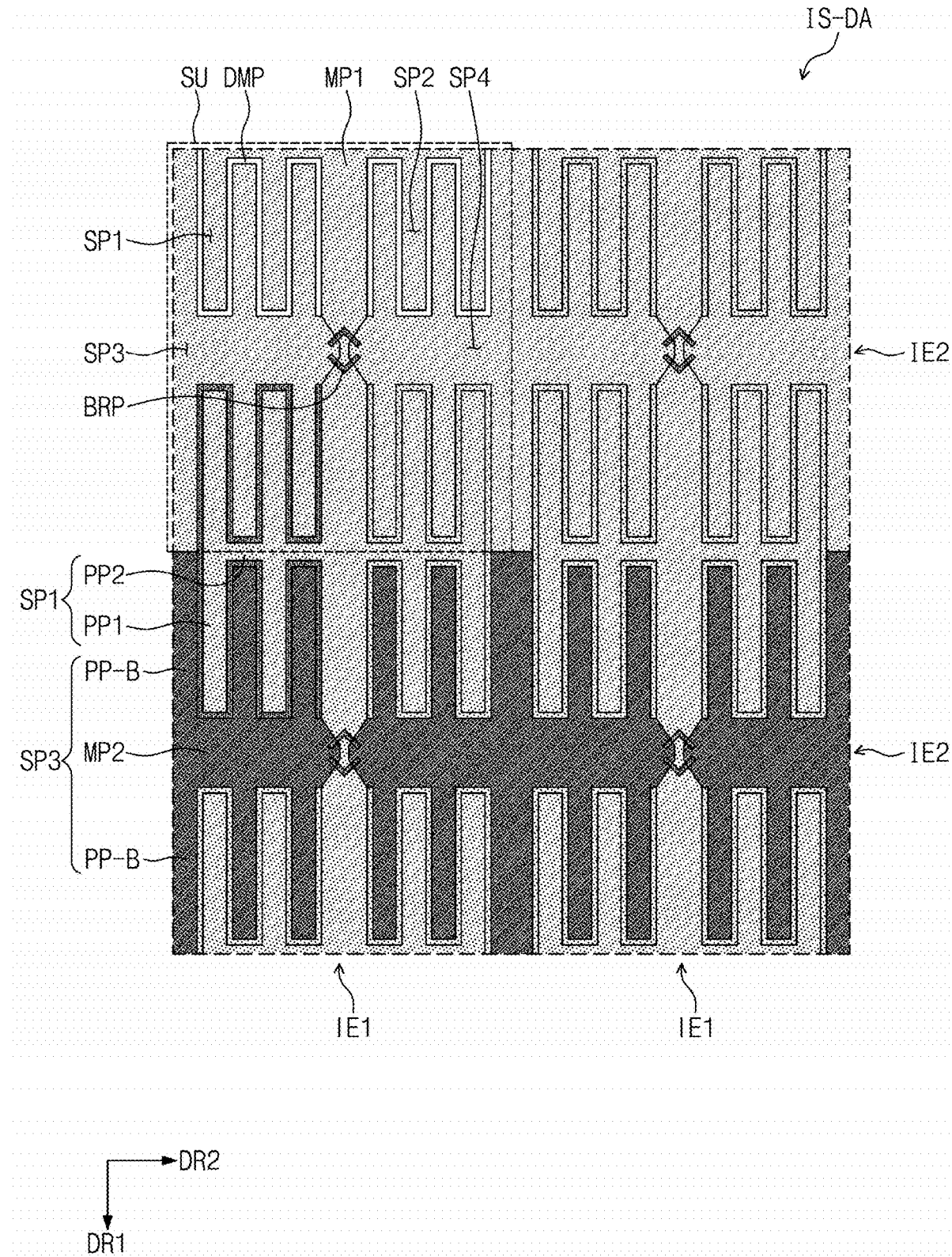

Referring to FIG. 15, the number of each of the first sensing portion SP1 and the second sensing portion SP2 disposed between two cross areas may be varied. One first sensing portion SP1 and one second sensing portion SP2 may be disposed between the two cross areas. A half of the first sensing portion SP1 is disposed on one sensing area SU, and the other half of the first sensing portion SP1 is disposed on the other sensing area SU.

According to present exemplary embodiment compared to the previous exemplary embodiment, the second subportions PP3 and the second middle portions PP4 are omitted. Each of the third sensing portion SP3 and the fourth sensing portion includes branch portions PP-B and disposed between the first sub-parts PP1 and are extended from the second main portions MP2.

A feature in which one sensing area SU in FIG. 8A and one sensing area SU in FIG. 15 are compared will be described below. Two first sensing portions SP1 and two second sensing portion SP2 are disposed on one sensing area SU in each of FIGS. 8A and 15. Here, the first sensing portion SP1 in each of FIGS. 8A and 15 has a different shape. Also, the second sensing portion SP2 in each of FIGS. 8A and 15 has a different shape. One first sensing portion SP1 in FIG. 15 has a shape similar to that of one first sensing portion SP1 in FIG. 8A. However, two first sensing portions SP1 in FIG. 15 have an area greater than that of one sensing portion SP1 in FIG. 8A.

According to the above description, the gap between the first electrode and the second electrode relatively increases. Thus, the intensity of the electric field that is not related to the variance ($\Delta C_m$) of the capacitance of the electric field between the first electrode and the second electrode may be reduced.

The area of each of the first electrode and the second electrode for the unit area increases, and the area of the floating electrode decreases. Also, the length of the edge, at which the first electrode faces the second electrode, increases. As a result, the intensity of the electric field related to the variance of the capacitance of the electric field between the first electrode and the second electrode may increase. Thus, the sensing sensitivity improves.

As the dummy electrode is disposed between the first electrode and the second electrode, the spaced area between the first electrode and the second electrode may be filled with the pattern similar to the electrode. The phenomenon in which the area between the first electrode and the second electrode is seen may be prevented.

The intensity of the capacitance between the first electrode and the second electrode may be controlled by changing the area or surface area on which the dummy electrode is disposed.

The capacitance ($C_m$) between the first electrode and the second electrode may be insensitive to the external environment and maintain a constant value. Although the dielectric constant of the dielectric layer contacting the first electrode and the second electrode varies sensitively to the external environment, the capacitance related to the dielectric layer has a low ratio with respect to the entire capacitance between the first electrode and the second electrode. This is because the gap between the first electrode and the second electrode increases, and the intensity of the electric field related to the dielectric layer decreases.

Although certain exemplary embodiments and implementations have been described herein, other embodiments and modifications will be apparent from this description. Accordingly, the inventive concept is not limited to such embodiments, but rather to the broader scope of the appended claims and various obvious modifications and equivalent arrangements as would be apparent to a person of ordinary skill in the art.

What is claimed is:

1. A display device comprising:
    a display panel; and
    an input sensor disposed on the display panel and comprising a first electrode extending in a first direction and a second electrode extending in a second direction crossing the first direction,
    wherein the first electrode comprises:
        a first main portion extending in the first direction; and
        a first sensing portion and a second sensing portion, which are disposed with the first main portion therebetween in the second direction and each of which extends from the first main portion; and
    each of the first sensing portion and the second sensing portion comprises:
        a first-first sub portion extending in the first direction;
        a first-second sub portion extending in the first direction;
        a first-first middle portion disposed between the first-first sub portion and the first main portion; and
        a first-second middle portion disposed between the first-second sub portion and the first-first sub portion,
    wherein a length of each of the first-first sub portion and the first-second sub portion is greater than a length of each of the first-first middle portion and the first-second middle portion in the first direction,
    wherein the second electrode comprises a third sensing portion and a fourth sensing portion, which are disposed with the first main portion therebetween in the second direction,
    wherein each of the third sensing portion and the fourth sensing portion comprises:
        a first portion;
        a second portion facing the first portion in the first direction; and
        a third portion disposed between the first portion and the second portion and extending in the first direction,
    wherein each of the first portion and the second portion includes a first sub portion disposed between and overlapping the first-first sub portion and the first main portion in the second direction and a second sub portion disposed between and overlapping the first-second sub portion and the first-first sub portion of one of the first sensing portion or the second sensing portion in the second direction.

2. The display device of claim 1, wherein the second electrode further comprises a bridge disposed on a different layer from the third sensing portion and the fourth sensing portion and connecting the third sensing portion and the fourth sensing portion and overlapping the first main portion.

3. The display device of claim 2, wherein:
the display panel comprises a light emitting element and an upper insulation layer covering the light emitting element; and
the input sensor further comprises a sensor insulation layer contacting the bridge; and
one of the bridge and the sensor insulation layer contacts the upper insulation layer.

4. The display device of claim 1, wherein the first sensing portion includes a first-first sensing portion and a first-second sensing portion spaced apart from the first-first sensing portion in the second direction, and
the second sensing portion includes a second-first sensing portion and a second-second sensing portion spaced apart from the second-first sensing portion in the second direction.

5. The display device of claim 4, wherein the first portion of the third sensing portion is disposed between the first-first sensing portion and the first-second sensing portion in the first direction, and
the first portion of the fourth sensing portion is disposed between the second-first sensing portion and the second-second sensing portion in the first direction.

6. The display device of claim 4, wherein the second portion includes a second-first portion and a second-second portion, and
the first-first sensing portion is disposed between the second-first portion and the first portion in the first direction, and
the first-second sensing portion is disposed between the second-second portion and the first portion in the first direction.

7. The display device of claim 1, wherein the input sensor further comprises a dummy electrode disposed between the first sensing portion and the third sensing portion.

8. The display device of claim 7, wherein the dummy electrode is disposed between the first-second sub portion and the third portion.

9. The display device of claim 1, wherein:
the display panel comprises a plurality of light emitting areas; and
the first electrode and the second electrode comprise a plurality of conductive lines configured to define a plurality of openings corresponding to the plurality of light emitting areas.

10. The display device of claim 1, wherein the display device is foldable with respect to a reference axis.

11. The display device of claim 1, further comprising:
an upper member disposed on the input sensor and comprising a polarizer; and
an adhesive member attaching the upper member and the input sensor.

12. The display device of claim 11, wherein the first electrode and the second electrode contact the adhesive member.

* * * * *